US008887281B2

(12) United States Patent
Honig et al.

(10) Patent No.: US 8,887,281 B2
(45) Date of Patent: Nov. 11, 2014

(54) SYSTEM AND METHODS FOR ADAPTIVE MODEL GENERATION FOR DETECTING INTRUSION IN COMPUTER SYSTEMS

(75) Inventors: Andrew Honig, East Windsor, NJ (US); Andrew Howard, Lansdale, PA (US); Eleazar Eskin, Santa Monica, CA (US); Salvatore J. Stolfo, Ridgewood, NJ (US)

(73) Assignee: The Trustees of Columbia University in The City of New York, New York, NY (US)

( * ) Notice: Subject to any disclaimer, the term of this patent is extended or adjusted under 35 U.S.C. 154(b) by 0 days.

(21) Appl. No.: 13/573,314

(22) Filed: Sep. 10, 2012

(65) Prior Publication Data

US 2013/0031633 A1    Jan. 31, 2013

Related U.S. Application Data

(63) Continuation of application No. 11/805,946, filed on May 25, 2007, which is a continuation of application No. 10/352,342, filed on Jan. 27, 2003, now Pat. No. 7,225,343.

(60) Provisional application No. 60/351,913, filed on Jan. 25, 2002.

(51) Int. Cl.
*H04L 29/06* (2006.01)
*G06F 21/55* (2013.01)
*G06F 21/56* (2013.01)

(52) U.S. Cl.
CPC .......... *H04L 63/1416* (2013.01); *G06F 21/554* (2013.01); *H04L 63/14* (2013.01); *H04L 63/1425* (2013.01); *G06F 21/566* (2013.01)
USPC ............................................ 726/23; 713/189

(58) Field of Classification Search
CPC ....... G06F 21/566; G06D 21/55; H04L 63/14
USPC ............................................... 726/23; 713/183
See application file for complete search history.

(56) References Cited

U.S. PATENT DOCUMENTS 5,278,901 A  *  1/1994  Shieh et al. ..................... 726/22
5,280,626 A      1/1994  Kondo et al.
(Continued)

FOREIGN PATENT DOCUMENTS

JP         11-167533        6/1999
JP       2001-034554        2/2001
(Continued)

OTHER PUBLICATIONS

U.S. Appl. No. 12/022,425, Feb. 20, 2013 Response to Non-Final Office Action.
(Continued)

*Primary Examiner* — Techane Gergiso
(74) *Attorney, Agent, or Firm* — Baker Botts L.L.P.

(57) ABSTRACT

A system and methods for detecting intrusions in the operation of a computer system comprising a sensor configured to gather information regarding the operation of the computer system, to format the information in a data record, and to transmit the data record. A database is configured to receive the data record from the sensor and to store the data record. A detection model generator is configured to request data records from the database, to generate an intrusion detection model, and to transmit the intrusion detection model to the database. A detector is configured to receive a data record from the sensor and to classify the data record in real-time as one of normal operation and an attack. A data analysis engine is configured to request data records from the database and to perform a data processing function on the data records.

30 Claims, 3 Drawing Sheets

(56) References Cited

U.S. PATENT DOCUMENTS

| | | | |
|---|---|---|---|
| 5,448,722 A | 9/1995 | Lynne et al. | |
| 5,452,442 A | 9/1995 | Kephart | |
| 5,485,575 A | 1/1996 | Chess et al. | |
| 5,511,163 A | 4/1996 | Lerche et al. | |
| 5,557,742 A | 9/1996 | Smaha et al. | |
| 5,621,889 A * | 4/1997 | Lermuzeaux et al. | 726/22 |
| 5,649,095 A | 7/1997 | Cozza | |
| 5,675,711 A | 10/1997 | Kephart et al. | |
| 5,765,170 A | 6/1998 | Morikawa | |
| 5,832,208 A | 11/1998 | Chen et al. | |
| 5,907,834 A | 5/1999 | Kephart et al. | |
| 5,951,698 A | 9/1999 | Chen et al. | |
| 5,960,170 A | 9/1999 | Chen et al. | |
| 6,006,329 A | 12/1999 | Chi | |
| 6,016,546 A | 1/2000 | Kephart et al. | |
| 6,108,786 A | 8/2000 | Knowlson | |
| 6,161,130 A | 12/2000 | Horvitz et al. | |
| 6,263,348 B1 | 7/2001 | Kathrow et al. | |
| 6,266,664 B1 | 7/2001 | Russell-Falla et al. | |
| 6,275,850 B1 | 8/2001 | Beyda et al. | |
| 6,279,113 B1 * | 8/2001 | Vaidya | 726/23 |
| 6,282,546 B1 * | 8/2001 | Gleichauf et al. | 726/25 |
| 6,336,109 B2 | 1/2002 | Howard | |
| 6,338,141 B1 | 1/2002 | Wells | |
| 6,347,374 B1 | 2/2002 | Drake et al. | |
| 6,357,008 B1 | 3/2002 | Nachenberg | |
| 6,370,648 B1 * | 4/2002 | Diep | 726/22 |
| 6,405,318 B1 | 6/2002 | Rowland | |
| 6,434,745 B1 | 8/2002 | Conley et al. | |
| 6,513,122 B1 | 1/2003 | Magdych et al. | |
| 6,519,703 B1 | 2/2003 | Joyce | |
| 6,530,024 B1 | 3/2003 | Proctor | |
| 6,567,808 B1 | 5/2003 | Eschelbeck et al. | |
| 6,594,686 B1 | 7/2003 | Edwards et al. | |
| 6,597,777 B1 | 7/2003 | Ho | |
| 6,598,076 B1 | 7/2003 | Chang et al. | |
| 6,622,134 B1 | 9/2003 | Sorkin | |
| 6,647,400 B1 | 11/2003 | Moran | |
| 6,671,811 B1 * | 12/2003 | Diep et al. | 726/23 |
| 6,681,331 B1 | 1/2004 | Munson et al. | |
| 6,694,303 B1 | 2/2004 | Agrawal et al. | |
| 6,697,950 B1 | 2/2004 | Ko | |
| 6,698,016 B1 | 2/2004 | Ghizzoni | |
| 6,704,874 B1 | 3/2004 | Porras et al. | |
| 6,735,700 B1 | 5/2004 | Flint et al. | |
| 6,735,703 B1 | 5/2004 | Kilpatrick et al. | |
| 6,742,124 B1 * | 5/2004 | Kilpatrick et al. | 726/23 |
| 6,763,462 B1 | 7/2004 | Marsh | |
| 6,769,066 B1 | 7/2004 | Botros et al. | |
| 6,772,346 B1 | 8/2004 | Chess et al. | |
| 6,775,780 B1 | 8/2004 | Muttik | |
| 6,778,995 B1 | 8/2004 | Gallivan | |
| 6,785,818 B1 | 8/2004 | Sobel et al. | |
| 6,789,202 B1 | 9/2004 | Ko et al. | |
| 6,813,682 B2 | 11/2004 | Bress et al. | |
| 6,820,081 B1 | 11/2004 | Kawai et al. | |
| 6,826,609 B1 | 11/2004 | Smith et al. | |
| 6,826,694 B1 | 11/2004 | Dutta et al. | |
| 6,839,850 B1 | 1/2005 | Campbell et al. | |
| 6,888,548 B1 | 5/2005 | Gallivan | |
| 6,898,712 B2 | 5/2005 | Vignoles et al. | |
| 6,907,430 B2 * | 6/2005 | Chong et al. | 1/1 |
| 6,910,135 B1 * | 6/2005 | Grainger | 726/23 |
| 6,928,549 B2 | 8/2005 | Brock et al. | |
| 6,938,161 B2 | 8/2005 | Vignoles et al. | |
| 6,957,259 B1 | 10/2005 | Malik | |
| 6,963,983 B2 | 11/2005 | Munson et al. | |
| 6,970,924 B1 | 11/2005 | Chu | |
| 6,971,019 B1 | 11/2005 | Nachenberg | |
| 6,973,577 B1 | 12/2005 | Kouznetsov | |
| 6,978,274 B1 | 12/2005 | Gallivan et al. | |
| 6,983,380 B2 | 1/2006 | Ko | |
| 7,007,299 B2 | 2/2006 | Ioele et al. | |
| 7,013,483 B2 | 3/2006 | Cohen et al. | |
| 7,016,939 B1 | 3/2006 | Rothwell et al. | |
| 7,032,031 B2 | 4/2006 | Jungck et al. | |
| 7,035,876 B2 | 4/2006 | Kawai et al. | |
| 7,039,953 B2 | 5/2006 | Black et al. | |
| 7,043,758 B2 | 5/2006 | Grupe | |
| 7,065,657 B1 | 6/2006 | Moran | |
| 7,065,789 B1 | 6/2006 | Neyman et al. | |
| 7,076,527 B2 | 7/2006 | Bellegarda et al. | |
| 7,080,076 B1 | 7/2006 | Williamson et al. | |
| 7,092,992 B1 | 8/2006 | Yu | |
| 7,093,239 B1 | 8/2006 | van der Made | |
| 7,146,305 B2 | 12/2006 | van der Made | |
| 7,159,237 B2 * | 1/2007 | Schneier et al. | 726/3 |
| 7,162,741 B2 | 1/2007 | Eskin et al. | |
| 7,188,367 B1 | 3/2007 | Edwards et al. | |
| 7,188,369 B2 | 3/2007 | Ho et al. | |
| 7,225,343 B1 | 5/2007 | Honig et al. | |
| 7,243,373 B2 | 7/2007 | Muttik et al. | |
| 7,272,855 B1 | 9/2007 | Yemeni et al. | |
| 7,376,970 B2 | 5/2008 | Marinescu | |
| 7,392,543 B2 | 6/2008 | Szor | |
| 7,424,619 B1 | 9/2008 | Fan et al. | |
| 7,448,084 B1 | 11/2008 | Apap et al. | |
| 7,461,402 B1 | 12/2008 | Lyle et al. | |
| 7,475,405 B2 | 1/2009 | Manganaris et al. | |
| 7,478,077 B2 | 1/2009 | Berger et al. | |
| 7,487,544 B2 | 2/2009 | Schultz et al. | |
| 7,492,720 B2 | 2/2009 | Pruthi et al. | |
| 7,502,939 B2 | 3/2009 | Radatti | |
| 7,574,740 B1 | 8/2009 | Kennis | |
| 7,607,171 B1 | 10/2009 | Marsden et al. | |
| 7,657,935 B2 | 2/2010 | Stolfo et al. | |
| 7,735,138 B2 | 6/2010 | Zhao | |
| 7,779,472 B1 | 8/2010 | Lou | |
| 7,818,797 B1 | 10/2010 | Fan et al. | |
| 7,836,503 B2 | 11/2010 | Tarquini et al. | |
| 8,108,929 B2 | 1/2012 | Agrawal | |
| 8,528,086 B1 | 9/2013 | Aziz | |
| 2002/0026605 A1 | 2/2002 | Terry | |
| 2002/0046275 A1 | 4/2002 | Crosbie et al. | |
| 2002/0059383 A1 | 5/2002 | Katsuda | |
| 2002/0059418 A1 | 5/2002 | Bird et al. | |
| 2002/0065892 A1 | 5/2002 | Malik | |
| 2002/0078381 A1 * | 6/2002 | Farley et al. | 713/201 |
| 2002/0082886 A1 | 6/2002 | Manganaris et al. | |
| 2002/0083343 A1 | 6/2002 | Crosbie et al. | |
| 2002/0133721 A1 * | 9/2002 | Adjaoute | 713/201 |
| 2002/0138755 A1 | 9/2002 | Ko | |
| 2002/0161763 A1 | 10/2002 | Ye et al. | |
| 2002/0197978 A1 * | 12/2002 | Zavidniak | 455/410 |
| 2003/0051026 A1 | 3/2003 | Carter et al. | |
| 2003/0070003 A1 * | 4/2003 | Chong et al. | 709/330 |
| 2003/0110274 A1 | 6/2003 | Pazi | |
| 2003/0172167 A1 | 9/2003 | Judge et al. | |
| 2003/0188189 A1 | 10/2003 | Desai et al. | |
| 2004/0172557 A1 | 9/2004 | Nakae et al. | |
| 2004/0225627 A1 * | 11/2004 | Botros et al. | 706/16 |
| 2005/0015624 A1 | 1/2005 | Ginter et al. | |
| 2005/0182969 A1 | 8/2005 | Ginter et al. | |
| 2005/0188272 A1 | 8/2005 | Bodorin et al. | |
| 2006/0080656 A1 | 4/2006 | Cain et al. | |
| 2006/0174319 A1 | 8/2006 | Kraemer et al. | |
| 2007/0006303 A1 | 1/2007 | Donnelly et al. | |
| 2007/0239999 A1 | 10/2007 | Honig et al. | |
| 2008/0010251 A1 | 1/2008 | Fontoura et al. | |
| 2008/0222731 A1 * | 9/2008 | Dowd et al. | 726/25 |
| 2010/0169970 A1 | 7/2010 | Stolfo et al. | |
| 2013/0239210 A1 | 9/2013 | Stolfo et al. | |

FOREIGN PATENT DOCUMENTS

| | | |
|---|---|---|
| JP | 2001-134433 | 5/2001 |
| JP | 2002-342106 | 11/2002 |
| JP | 2004-038273 | 2/2004 |
| WO | WO 02/097624 | 12/2002 |
| WO | WO 2007/006994 | 1/2007 |

OTHER PUBLICATIONS

U.S. Appl. No. 12/633,493, Mar. 4, 2013 Notice of Allowance.

(56) References Cited

OTHER PUBLICATIONS

U.S. Appl. No. 12/022,425, Oct. 30, 2012 Non-Final Office Action.
U.S. Appl. No. 12/633,493, Dec. 10, 2012 Response to Non-Final Office Action.
U.S. Appl. No. 10/320,259, filed Dec. 16, 2002, Abandoned.
U.S. Appl. No. 10/327,811, filed Dec. 19, 2002, Abandoned.
U.S. Appl. No. 12/022,425, filed Jan. 30, 2008.
U.S. Appl. No. 10/208,402, Nov. 30, 2006 Issue Fee payment.
U.S. Appl. No. 10/208,402, Aug. 31, 2006 Notice of Allowance.
U.S. Appl. No. 10/208,402, May 22, 2006 Response to Non-Final Office Action.
U.S. Appl. No. 10/208,402, Feb. 10, 2006 Non-Final Office Action.
U.S. Appl. No. 10/208,432, Dec. 23, 2008 Issue Fee payment.
U.S. Appl. No. 10/208,432, Nov. 3, 2008 Notice of Allowance.
U.S. Appl. No. 10/208,432, Aug. 13, 2008 Amendment and Response to Election Requirement.
U.S. Appl. No. 10/208,432, Jul. 30, 2008 Election Requirement.
U.S. Appl. No. 10/208,432, Jun. 13, 2008 Response to Non-Final Office Action.
U.S. Appl. No. 10/208,432, Mar. 18, 2008 Non-Final Office Action.
U.S. Appl. No. 10/208,432, Dec. 28, 2007 Response to Notice of Non-Compliant.
U.S. Appl. No. 10/208,432, Nov. 30, 2007 Notice of Non-Compliant.
U.S. Appl. No. 10/208,432, Nov. 13, 2007 Response to Non-Final Office Action.
U.S. Appl. No. 10/208,432, Jul. 12, 2007 Non-Final Office Action.
U.S. Appl. No. 10/208,432, Apr. 23, 2007 Pre-Brief Appeal Conference Decision.
U.S. Appl. No. 10/208,432, Mar. 13, 2007 Notice of Appeal and Pre-Brief Conference Request.
U.S. Appl. No. 10/208,432, Nov. 14, 2006 Final Office Action.
U.S. Appl. No. 10/208,432, Aug. 29, 2006 Response to Non-Final Office Action.
U.S. Appl. No. 10/208,432, Mar. 24, 2006 Non-Final Office Action.
U.S. Appl. No. 10/222,632, Dec. 8, 2009 Issue Fee payment.
U.S. Appl. No. 10/222,632, Sep. 8, 2009 Notice of Allowance.
U.S. Appl. No. 10/222,632, Jun. 8, 2009 Response to Non-Final Office Action.
U.S. Appl. No. 10/222,632, Dec. 12, 2008 Non-Final Office Action.
U.S. Appl. No. 10/222,632, Nov. 13, 2008 Amendment and Request for Continued Examination (RCE).
U.S. Appl. No. 10/222,632, Jul. 2, 2008 Final Office Action.
U.S. Appl. No. 10/222,632, Mar. 4, 2008 Response to Non-Final Office Action.
U.S. Appl. No. 10/222,632, Oct. 11, 2007 Non-Final Office Action.
U.S. Appl. No. 10/222,632, Aug. 9, 2007 Pre-Brief Appeal Conference Decision.
U.S. Appl. No. 10/222,632, Apr. 26, 2007 Notice of Appeal and Pre-Brief Appeal Conference Request.
U.S. Appl. No. 10/222,632, Feb. 28, 2007 Advisory Action.
U.S. Appl. No. 10/222,632, Feb. 5, 2007 Response to Final Office Action.
U.S. Appl. No. 10/222,632, Oct. 31, 2006 Final Office Action.
U.S. Appl. No. 10/222,632, Aug. 9, 2006 Response to Non-Final Office Action.
U.S. Appl. No. 10/222,632, Mar. 7, 2006 Non-Final Office Action.
U.S. Appl. No. 10/269,694, Aug. 5, 2008 Issue Fee payment.
U.S. Appl. No. 10/269,694, May 5, 2008 Notice of Allowance.
U.S. Appl. No. 10/269,694, Apr. 10, 2008 Supplemental Response to Non-Final Office Action.
U.S. Appl. No. 10/269,694, Jan. 22, 2008 Response to Non-Final Office Action.
U.S. Appl. No. 10/269,694, Sep. 24, 2007 Non-Final Office Action.
U.S. Appl. No. 10/269,694, Jun. 22, 2007 Response to Non-Final Office Action.
U.S. Appl. No. 10/269,694, Feb. 22, 2007 Non-Final Office Action.
U.S. Appl. No. 10/269,694, Nov. 30, 2006 Response to Non-Final Office Action.
U.S. Appl. No. 10/269,694, Jun. 28, 2006 Non-Final Office Action.
U.S. Appl. No. 10/269,718, Sep. 13, 2010 Issue Fee payment.
U.S. Appl. No. 10/269,718, Jun. 14, 2010 Notice of Allowance.
U.S. Appl. No. 10/269,718, Mar. 4, 2010 Response to Non-Final Office Action.
U.S. Appl. No. 10/269,718, Jan. 29, 2010 Non-Final Office Action.
U.S. Appl. No. 10/269,718, Jan. 11, 2010 Amendment and Request for Continued Examination (RCE).
U.S. Appl. No. 10/269,718, Jun. 11, 2009 Notice of Appeal.
U.S. Appl. No. 10/269,718, Dec. 11, 2008 Final Office Action.
U.S. Appl. No. 10/269,718, Aug. 14, 2008 Response to Non-Final Office Action.
U.S. Appl. No. 10/269,718, May 16, 2008 Non-Final Office Action.
U.S. Appl. No. 10/269,718, Apr. 10, 2008 Amendment after Notice of Appeal.
U.S. Appl. No. 10/269,718, Mar. 3, 2008 Pre-Brief Appeal Conference Decision.
U.S. Appl. No. 10/269,718, Feb. 19, 2008 Notice of Appeal and Pre-Brief Conference Request.
U.S. Appl. No. 10/269,718, Nov. 20, 2007 Final Office Action.
U.S. Appl. No. 10/269,718, Sep. 4, 2007 Response to Non-Final Office Action.
U.S. Appl. No. 10/269,718, Jun. 1, 2007 Non-Final Office Action.
U.S. Appl. No. 10/269,718, Mar. 7, 2007 Amendment and Request for Continued Examination (RCE).
U.S. Appl. No. 10/269,718, Sep. 14, 2006 Final Office Action.
U.S. Appl. No. 10/269,718, Jun. 29, 2006 Response to Non-Final Office Action.
U.S. Appl. No. 10/269,718, Feb. 27, 2006 Non-Final Office Action.
U.S. Appl. No. 10/320,259, Feb. 22, 2008 Notice of Abandonment.
U.S. Appl. No. 10/320,259, Aug. 10, 2007 Pre-Brief Appeal Conference Decision.
U.S. Appl. No. 10/320,259, Jul. 2, 2007 Notice of Appeal and Pre-Brief Conference Request.
U.S. Appl. No. 10/320,259, Apr. 2, 2007 Final Office Action.
U.S. Appl. No. 10/320,259, Dec. 22, 2006 Response to Non-Final Office Action.
U.S. Appl. No. 10/320,259, Aug. 22, 2006 Non-Final Office Action.
U.S. Appl. No. 10/352,342, Apr. 10, 2007 Amendment after Notice of Allowance and Issue Fee payment.
U.S. Appl. No. 10/352,342, Jan. 10, 2007 Notice of Allowance.
U.S. Appl. No. 10/352,342, Nov. 13, 2006 Response to Non-Final Office Action.
U.S. Appl. No. 10/352,342, May 12, 2006 Non-Final Office Action.
U.S. Appl. No. 10/352,343, Jul. 2, 2008 Issue Fee payment.
U.S. Appl. No. 10/352,343, May 22, 2008 Notice of Allowance.
U.S. Appl. No. 10/352,343, May 2, 2008 Response to Final Office Action.
U.S. Appl. No. 10/352,343, Mar. 18, 2008 Final Office Action.
U.S. Appl. No. 10/352,343, Dec. 19, 2007 Response to Non-Final Office Action.
U.S. Appl. No. 10/352,343, Jul. 24, 2007 Non-Final Office Action.
U.S. Appl. No. 10/352,343, May 11, 2007 Request for Continued Examination (RCE).
U.S. Appl. No. 10/352,343, Apr. 11, 2007 Advisory Action.
U.S. Appl. No. 10/352,343, Mar. 12, 2007 Response to Final Office Action.
U.S. Appl. No. 10/352,343, Nov. 14, 2006 Final Office Action.
U.S. Appl. No. 10/352,343, Aug. 28, 2006 Response to Non-Final Office Action.
U.S. Appl. No. 10/352,343, Mar. 23, 2006 Non-Final Office Action.
U.S. Appl. No. 10/327,811, Jan. 7, 2010 Notice of Abandonment.
U.S. Appl. No. 10/327,811, Jan. 26, 2009 Final Office Action.
U.S. Appl. No. 10/327,811, Dec. 10, 2008 Response to Non-Final Office Action.
U.S. Appl. No. 10/327,811, Sep. 29, 2008 Non-Final Office Action.
U.S. Appl. No. 10/327,811, Aug. 29, 2008 Amendment and Request for Continued Examination (RCE).
U.S. Appl. No. 10/327,811, Jun. 6, 2008 Pre-Brief Appeal Conference Decision.
U.S. Appl. No. 10/327,811, Mar. 31, 2008 Notice of Appeal and Pre-Brief Conference Request.
U.S. Appl. No. 10/327,811, Nov. 2, 2007 Final Office Action.
U.S. Appl. No. 10/327,811, Oct. 11, 2007 Response to Non-Final Office Action.

(56) References Cited

OTHER PUBLICATIONS

U.S. Appl. No. 10/327,811, Jun. 11, 2007 Non-Final Office Action.
U.S. Appl. No. 10/327,811, Apr. 23, 2007 Amendment and Request for Continued Examination (RCE).
U.S. Appl. No. 10/327,811, Dec. 22, 2006 Final Office Action.
U.S. Appl. No. 10/327,811, Sep. 28, 2006 Response to Non-Final Office Action.
U.S. Appl. No. 10/327,811, Apr. 25, 2006 Non-Final Office Action.
U.S. Appl. No. 11/805,946, Mar. 11, 2011 Amendment and Request for Continued Examination (RCE).
U.S. Appl. No. 11/805,946, Oct. 18, 2010 Final Office Action.
U.S. Appl. No. 11/805,946, Jul. 21, 2010 Response to Non-Final Office Action.
U.S. Appl. No. 11/805,946, Feb. 22, 2010 Non-Final Office Action.
U.S. Appl. No. 11/805,946, Dec. 28, 2009 Terminal Disclaimer Review Decision.
U.S. Appl. No. 11/805,946, Nov. 23, 2009 Response to Non-Final Office Action and Terminal Disclaimer filed.
U.S. Appl. No. 11/805,946, Aug. 28, 2009 Non-Final Office Action.
U.S. Appl. No. 12/022,425, Feb. 24, 2011 Amendment and Request for Continued Examination (Rce).
U.S. Appl. No. 12/022,425, Sep. 1, 2010 Final Office Action.
U.S. Appl. No. 12/022,425, Jun. 15, 2010 Response to Non-Final Office Action.
U.S. Appl. No. 12/022,425, Mar. 11, 2010 Non-Final Office Action.
U.S. Appl. No. 12/633,493, Aug. 16, 2012 Non-Final Office Action.
U.S. Appl. No. 12/633,493, Apr. 11, 2012 Amendment and Request for Continued Examination (RCE).
U.S. Appl. No. 12/633,493, Jan. 19, 2012 Final Office Action.
U.S. Appl. No. 12/633,493, Nov. 29, 2011 Response to Non-Final Office Action.
U.S. Appl. No. 12/633,493, Aug. 1, 2011 Non-Final Office Action.
Y. Singer. "Adaptive Mixtures of Probablistics Transducers." Neural Computation, 1977, 9(8): pp. 1711-1734.
D. Ron, Y. Singer and N. Tishby. "The Power of Amnesia: Learning Probablistic Automata with Variable Memory Length." Machine Learning, 1996, 25: pp. 117-150.
F. Pereira and Y Singer. "An Efficient Extension to Mixture Techniques for Prediction and Decision Trees." Machine Learning, 1999, 36(3): pp. 183-199.
C. Marceau. "Characterizing the Behavior of a Program Using Multiple-Length N-Grams." Proceedings of the New Security Paradigms Workshop 2000, 2000, pp. 101-110.
W. Lee and D. Xiang. "Information-Theoretic Measures for Anomaly Detection." Proceedings of the 2001 IEEE Symposium on Security and Privacy, May 2001, pp. 1-17.
Kymie M.C. Tan, Roy A. Maxion:"'Why 6?' Defining the Operation Limits of stide, an Anomaly-Based Intrusion Detector." IEEE Symposium on Security and Privacy 2002, May 12-15, 2002, pp. 188-201.
Eleazar Eskin, William Noble Grundy, Yoram Singer. "Protein Family Classification using Sparse Markov Transducers," Proceedings of the Eighth Internation Conference on Intelligent Systems for Molecular Biology, AAAI Press, Menlo Park, CA, 2000.
Jeffrey O. Kephart and William C. Arnold, "Automatic Extraction of Computer Virus Signatures," 4th Virus Bulletin Internation Conference, pp. 178-184, 1994.
R. Kohavi, A study of cross-validation and boot-strap for accuracy estimation and model selection, IJCAI, 1995.
Ronald L. Rivest, "The MD5 Message Digest Algorithm." published as Internet RFC 1321, Apr. 1992. http://www.freesoft.org/CIE/RFC/1321/.
Stephen R. van den Berg and Philip Guenther, "Procmail." online publication, 2001. http://www.procmail.org.
Steve R. White, Morton Swimmer, Edward J. Pring, William C. Arnold, David M. Chess, and John F. Morar, "Anatomy of a Commercial-Grade Immune System," IBM Research White Paper, 1999.
Yongguang Zhang, Wenke Lee, Yi-An Huang, "Intrusion Detection Techniques for Mobile Wireless Networks," Sep. 2003, Wireless Networks, vol. 9, Issue 5, pp. 545-556.

Anderson et al., "Next-Generation Intrusion Detection Expert Systems (NIDES): A Summary," Technical Report SRI-CSL-95-07, Computer Science Laboratory (1995).
Lippman et al., MIT Lincoln Laboratory "1998 Intrusion Detection Evaluation" (1998).
Cohen, "Fast Effective Rule Induction," Proceedings of Machine Learning: Proceedings of the Twelfth Internation Conference (1995).
Lee, A Data Mining Framework for Constructing Features and Models for Intrusion Detection Systems, Ph.D. Thesis, Columbia University (1999).
Honig A et al., (2002) "Adaptive Model Generation: An Architecture for the Deployment of Data Mining-based Intrusion Detection Systems." published in Data Mining for Security Applications, Kluwer.
Burroughs, D et al., Apr. 2002, "Analysis of Distributed Intrusion Detection Systems Using Bayesian Methods" presented at IPCCC.
Eskin E et al., (2002), "A geometric framework for unsupervised anomaly detection: Detecting intrusions in unlabeled data." Technical Report, CUCS Technical Report.
Apap F et al., (2001) "Detecting malicious software by monitoring anomalous windows registry accesses." Technical Report, CUCS Technical Report.
Mahoney M et al., (2001) "Detecting novel attacks by identifying anomalous network headers." Tehcnical Report CS-2001-2, Florida Institute of Technology, Melbourne, FL.
Portnoy L et al., (2001) "Intrusion detection with unlabeled data using clustering." In Proceedings of ACM CSS Workshop on Data Mining Applied to Security (DMSA-2001).
Eskin E et al., (2000) "Anomaly detection over noisy data using learned probability distributions." In Proceedings of the Seventeenth International Conference on Machine Learning (ICML-2000).
Lane T et al., (1999) "Temporal sequence learning and data reduction for anomaly detection." *ACM Transactions on Information and System Security*, 2(3):295-331.
Warrender C et al., (1999) "Detecting intrusions using system calls: alternative data models." In *Proceedings of the 1999 IEEE Symposium on Security and Privacy, IEEE Computer Society*, pp. 133-145.
Lee W et al., Aug. 1998, "Mining Audit Data to Build Intrusion Detection Models" In *Proceedings of the Fourth International Conference on Knowledge Discovery and Data Mining* (KDD '98), New York, NY.
Staniford-Chen S et al., Oct. 1998, "The common intrusion detection framework (cidf)." In *Proceedings of the Information Survivability Workshop*.
Lane T et al., (1997) "Sequence Matching and Learning in Anomaly Detection for Computer Security" AAAI Workshop: *AI Approaches to Fraud Detection and Risk Management* pp. 49-49.
Lee W et al., (1997) "Learning patterns from unix processes execution traces for intrusion detection." In *Proceedings of the AAAI-97 Workshop on AI Approaches to Fraud Detection and Risk Management* pp. 50-56. Menlo Park, CA: AAAI Press.
Bhattacharya M et al., 2002, "MET: An Experimental System for Malicious Email Tracking" Proceedings 2002 New Security Paradigms Workshop.
Schultz MG et al., Jun. 2001, "MEF: Malicious email filter—a unix filter that detects windows executables" http://www.cs.columbia.edu/ids/mef/rel_papers.html, USENIX Annual Technical Conference.
Schultz MG et al., May 2001, "Data mining methods for detection of new malicious executables" Proceedings of the IEEE Symposium on Security and Privacy.
Wang C et al., 2000, "On computer viral infection and the effect of immunization" *Proceedings of the 16th ACM Annual Computer Applications Conference*.
White SR, Oct. 1998, "Open problems in computer virus research" Online publication, http://www.research.ibm.com/antivirus/SciPapers/White/Problems, *Virus Bulletin Conference*, pp. 1-11.
Feng C et al., 1994, "Machine Learning of Rules and Trees" *Machine Learning, Neutral and Statistical Classification*, pp. 50-83.
W.O. International, 1993-2003, "PC Viruses in the Wild" http://www.bocklabs.wisc.edu/janda/wildlist.html, pp. 1-15.
Kephart JO, 1994, "A biologically inspired immune system for computers" *Artificial Life IV*, R. Brooks and P. Maes, eds., pp. 1-10.

(56) References Cited

OTHER PUBLICATIONS

Nong et al., Probablistic Techniques for Intrusion Detection based on Computer Audit Data published Jul. 2001, vol. 31 No. 4 Jul. 2001 pp. 266-274 IEEE.

Kin C. Bron and J. Kerbosch. "Algorithm 457:Finding All Cliques of an Undirected Graph," Communications of ACM, 16:575-577, 1973.

Kephart, Chess and White. "Computer and Epidemiology," IBM Watson Research Center, 1993, pp. 1-20.

D. E. Denning, "An Intrusion Detection Model," IEEE Transactions on Software Engineering, SE-13:222-232, 1987.

Wenke Lee, Sal Stolfo, and Kui Mok. "Mining in a Data-flow Environment: Experience in Network Intrusion Detection" In Proceedings of the 5th ACM SIGKDD International Conference on Knowledge Discovery & Data Mining (KDD '99), San Diego, CA, Aug. 1999.

S.A. Hofmeyr, Stephanie Forrest, and A. Somayaji, "Intrusion Detect Using Sequences of System Calls," Journal of Computer Security, 6:151-180, 1998.

N. Friedman and Y. Singer, "Efficient Bayesian Parameter Estimation in Large Discrete Domains," Advances in Neural Information Processing Systems 11, MIT Press, 1999.

H. Debar et al., "Intrusion Detection Exchange Format Data Model," Internet Engineering Task Force, Jun. 15, 2000.

Javits HS et al., Mar. 7, 1994, "The nides statistical component: Description and justification." Technical Report, SRI International.

Eskin, E., M. Miller, Z.D. Zhong, G. Yi, W.A. Lee, and S.J. Stolfo. Adaptive Model Generation for Intrusion Detection Systems. Workshop on Intrusion Detection and Prevention, 7th ACM Conference on Computer Security, Athens. Nov. 2000.

Korba, Jonathan. Windows NT Attacks for the Evaluatino of Intrusion Detection Systems, May 2000.

R.P. Campbell et al., "A modular Approach to Computer Security Risk Management," AFIPS Conference Proceedings, AFIPS Press, 1979.

U. Lindqvist et al., "How to Systematically Classify COmputer Security Intrusions," Proceedings of the 1997 IEEE Symposium on Research in Security and Privacy, Oakland, CA, May 1997, pp. 154-163.

S. Glaseman et al., "Problem Areas in Computer Security ASsessment," Proceedings off the National Computer Conference, 1977.

S. Northcutt, Intrusion Detection: An Analyst's Handbook, New Riders, 1999, pp. 39-40.

D. Denning, Information Warfare and Security, Addison Wesley, 1999, pp. 23-25, and 385-388.

R. Bace, Intrusion Detection, Macmillan Technical Publishing, 2000, pp. 156, 237-238.

E. Amoroso, Intrusion Detection: An Introduction to Internet Surveillance, Correlation, Traps, Trace Back, and Response, Intrusion. Net Books, 1999, pp. 145-167.

W.W.Cohen, "Fast Effective Rule Induction," Machine Learning: The 12th International Conference, Lake Tahoe, CA, 1995.

Quinlan, J.R., C4.5: Programs for Machine Learning. San Mateo: Morgan Kaufmann, 1993.

T. Mitchell. Machine Learning. McGraw-Hill, 1997, pp. 171-174.

P. Domingos, "Metacost: A General Method for Making Classifiers Cost-Sensitive," Proceedings of the 5th ACM SIGKDD Internation Conference on Knowledge Discovery & Data Mining (KDD-99), Aug. 1999.

Mohiuddin S et al., Jun. 2002, "Defending Against a large scale Denial-of-Service Attack" Proceedings of the 2002 IEEE Workshop on Information Assurance and Security, pp. 30-37.

Gibson S, 2001, "The Strange Tale of Denial of Service—Attacks Against grc.com" http://grc.com/dos/grcdos.htm, pp. 1-29.

Houle KJ, Oct. 2001, "Trends in Denial of Service Attack Technology" CERT® Coordination Center. 1.0:1-20.

Taylor C et al., Sep. 2001, "NATE—Network Analysis of Anomalous Traffic Events, a low-cost approach" New Security Paradigms Workshop, pp. 89-96.

Moskowitz IS et al., Mar. 2001, "Randomly Roving Agents for Intrusion Detection" Information Technology Division, Naval Research Laboratory, CHACS, pp. 1-16.

Moore D et al., 2001, "Inferring Internet Denial-of-Service Activity" Usenix, pp. 1-14.

Razmov V, May 2000, "Denial of Service Attacks and How to Defend Against Them" Computer Science and Engineering Department, University of Washington, pp. 1-7.

Roesch M, 1999, "Snort—Lightweight Intrusion Detection for Networks" LISA XIII Systems Conferences, Seattle, WA, pp, 229-238.

Spatscheck O et al., 1999, "Defending Against Denial of Service Attacks in Scout" Proceedings of 3rd USENIX/ACM, pp. 59-72.

Lippmann RP et al., 1999, "Results of the DARPA 1998 Offline Intrusion Detection Evaluation" MIT Lincoln Laboratory, pp. 1-29.

Ferguson P et al., 1998, "Network Ingress Filtering: Defeating Denial of Service Attacks which employ IP Source Address Spoofing" Internet Society pp. 1-10.

Perkins C, 1996 "RFC 2002: IP Mobility Support" http://www.faqs.org/rfcs/rfc2002.html, pp. 1-74.

Lane et al., "An Application of Machine Learning to Anomaly Detection," Feb. 14, 1997.

Dipankar et al., "An Intelligent Decision Support System for Intrusion Detection and Response," Published by Springer-Verlag, May 21-23, 2001, St. Petersburg, Russia.

U.S. Appl. No. 12/022,425, May 20, 2013 Notice of Allowance.
U.S. Appl. No. 13/987,690, filed Aug. 20, 2013.
U.S. Appl. No. 60/218,488, filed Jul. 14, 2000.
U.S. Appl. No. 60/244,618, filed Oct. 30, 2000.
U.S. Appl. No. 60/286,963, filed Apr. 30, 2001.

In the United States District Court for the Eastern District of Virginia Richmond Division: Civil Action No. 3:13-cv-808; *The Trustees of Columbia University in the City of New York v. Symantec Corporation*; Defendant Symantec Corporation's Preliminary Invalidity Contentions Pursuant to Paragraph 4 of the Additional Pretrial Order; Certificate of service date May 12, 2014.

Allen et al., "Detecting signs of Intrusion: Distribution Statement A; Approved for Public Release Distribution Unlimited", *Software Engineering Institute, Carnegie Mellon*, 173 pages (Oct. 2000).

Biermann, et al., "A comparison of intrusion detection systems", *Computers & Security*, 20(8):676-683 (2001).

Cannady, et al., "A comparative analysis of current intrusion detection technologies", *In Proceedings of the Fourth Conference on Technology for Information Security (ISC '96, May)*, 17 pages (1996).

Carr, et al., "Sophos anti-virus detection: a technical overview", *Sophos PLC*, 9 pages (Oct. 2002).

Chen, et al., "When virtual is better than real", *The Eighth IEEE workshop on Hot Topics in Operating Systems, HotOS-VIII*, pp. 116-121 (May 2-23, 2001).

Coates, et al., Virus detection—"The Brainy Way", *Virus Bulletin Conference Proceedings*, pp. 211-216 (1995).

CyberCop Monitor Getting Started Guide, Version 2.0 for Windows NT 4.0, 76 pages (1999).

Centrax® Version 3.1 User's Guide, *CyberSafe Corporation*, 173 pages (Jun. 2001).

Damp, "An analysis of the effectiveness of a constructive induction-based virus detection prototype", *Department of the Air Force Air University, Air Force Institute of Technology*, 101 pages (Apr. 2000).

De Vel "Mining E-mail Authorship", *KDD-2000 Workshop on Text Mining*, 7 pages (Aug. 2000).

Doumas, et al., "Design of a neural network for recognition and classification of computer viruses", *Computers & Security*, 14:435-448 (1995).

Gao, et al., "Behavioral distance for intrusion detection", *Lecture Notes in Computer Science 3585, Recent Advances in Intrusion Detection, 8th International Symposium, RAID 2005*, Seattle, WA, Sep. 7-9, 2005 3858:63-81 (2006).

Garfinkel, et al., "When virtual is harder than real: Security challenges in virtual machine based computing environments", *HotOS X-Technical Paper*, Retrieved on line https://www.usenix.org/legacy/events/hotos05/prelim_papers/garfinkel/garfinkel_html/ 12 pages retrieved on Mar. 5, 2014.

(56) References Cited

OTHER PUBLICATIONS

Guinier, "Computer "virus" identification by neural networks: An artificial intelligence connectionist implementation naturally made to work with fuzzy information", *ACM SIGSAC Review*, 9(4):49-59 (1991).

Harmer, "An distributed agent architecture for a computer virus immune system", *Department of the Air Force Air University, Air Force Institute of Technology*, 202 pages (Mar. 2000).

Hollander, "The future of web server security: Why your web site is still vulnerable to attack", *Entercept Security Technologies*, Entercept Web Server Edition, 27 pages (2000) Retrieved on line https://web.archive.org/web/20112161845300/http://clicknet.com/products/entercept/whitepapers/wpfuture.asp.

Hosmer, et al., "Detecting subtle system changes using digital signatures", IEEE, pp. 125-128 (1998).

Internet Security Systems, OS Sensor User Guide, 62 pages (Jan. 2001).

Ho, Swee Yenn (George) "Intrusion Detection—Systems for today and tomorrow", SANS Institute, SANS Institute, InfoSec Reading Room, 8 pages (2001).

Jiang, et al., "Virtual playgrounds for worm behavior investigation", *CERIAS Tech Report 2005-24*, 15 pages (2006).

Kephart, et al., "Blueprint for a computer immune system", Dipankar Dasgupta (Ed.) *Artificial Immune Systems and Their Applications*, pp. 242-261, (Oct. 1-3, 1997).

Lamont, et al., "A distributed architecture for a self-adaptive computer virus immune system", McGraw-Hill Publishing Company, *New Ideas in Optimization*, Chapter 11, pp. 167-183, received Dec. 2000.

Lane, et al., "Temporal sequence learning and data reduction for anomaly detection", *AMC Transactions on Information and System Security*, 2(3):295-331 (1999).

LaPadula, "State of the art in anomaly detection and reaction", *MITRE, Center for Integrated Intelligence Systems*, 37 pages (Jul. 1999).

Laureano, et al., "Intrusion detection in virtual machine environments", *Proceedings of the 30th EUROMICRO Conference (EUROMICRO '04)*, pp. 520-525 (2004).

Leitold "Reductions of the general virus detection problem", *Conference Proceedings EICAR International Conference*, pp. 24-30 (2001).

Lindqvist, et al., "eXpert-BSM: A host-based intrusion detection solution for sun solaris", *Proceedings of the 17th Annual Computer Security Applications Conference; IEEE Computer Society*, pp. 240-251 (2001).

McHugh, "Intrusion and intrusion detection", *IJIS*, 1:14-35 (2001).

Mori, "Detecting unknown computer viruses—A new approach-", *ISSS, Lecture Notes in Computer Science*, 3233:226-241, Springer (2003).

Robichaux, "Managing the windows NT Registry, Chapter 8: Administering the Windows NT Registry", O'Reilly & Associates, (1998) retrieved on line http://technet.microsoft.com/en-us/library/ce749939(d=printer).aspx on Mar. 6, 2014.

Sanok, "An analysis of how antivirus methodologies are utilized in protecting computers from malicious code", *Proceeding InfoSecCD '05 Proceedings of the 2nd Annual Conference on Information Security Curriculum Development*, pp. 142-144 (2005).

Schultz, et al., "Data mining methods for detection of new malicious executables", *IEEE*, pp. 38-49 (2001).

Schultz, et al., "Data mining methods for detection of new malicious executables", *Preliminary Program 2001 IEEE Symposium on Security and Privacy*, 13 pages, (May 13-16, 2001).

Sequeira, "Intrusion prevention systems: Security's silver bullet?", *Business Communications Review*, pp. 36-41 (2003).

Shavlik, et al., "Evaluating software sensors for actively profiling windows 2000 computer users", *Presented at the Fourth International Symposium on recent Advances in Intrusion Detection (RAID '01)*, 7 pages (2001).

Szor, "The art of computer virus research and defense", *Symantec Press, Addison Wesley Professional*, 614 pages (2005).

Wang, et al., "Virus detection using data mining techniques", *IEEE*, 71-76 (2003).

Zwienenberg, "Heuristic Scanners: Artificial Intelligence?", Virus Bulletin International Conference, Boston Park Plaza Hotel and Towers, Sep. 20-22, 1995, pp. 203-210.

White, et al., "Anatomy of a commercial-grade immune system", retrieved online http://www.research.ibm.com/antivirus/SciPapers/White/Anatomy/anatomy.html, Venue: Proc. Int'l Virus Bulletin Conf., 29 pages, (1999).

Teasuro, et al., "Neural networks for computer virus recognition", *IEEE Expert*, pp. 5-6 (1996).

"ThunderBYTE Plus MIMESweepr—Firewalls Mail attachments" from David Harley to Firewalls@greatCircle.com and ed@aicpress.com, dated: Jan. 23, 1997, *Great Circle*, retrieved online http://www.greatcircle.com/firewalls/mhonarc/firewalls.199701/msg00670.html, 3 pages, retrieved on Apr. 22, 2014.

ThunderBYTE Anti-Virus Utilities: User Manual,*ESSaSS B. V.*, (TBAV.txt) 172 pages, (1996) (SYMCOL00206298) (symco1216960).

Forrest, et al., "A sense of self for unix processes", *IEEE*, pp. 120-128 (1996).

Veldman, "Combating viruses heuristically", *Virus Bulletin Conference*, pp. 67-76 (1993).

"How can you protect against viruses?", MIMEsweeper Review: Business Computer World, Dec. 1996, retrieved on line https://web.archive.org/web/19970124231706/http://www.mimesweeper.integralis.com/Pr retrieve on Apr. 21, 2014.

MIMEsweeper SMTP FAQs, (Jan. 24, 1997) retrieved on line https://web.archive.org/web/19970124232123/http://www.mimesweeper.integralis.com/Te retrieved on Apr. 21, 2014.

MIMEsweeper FAQ: Our anti-virus tools scan all executable and files on the desktop. doesn't this make MIMEsweeper unnecessary?, (Jan. 24, 1997) retrieved on line http://web.archive.org/web/19970124232021/http://www.mimesweeper.integralis.com/Pr retrieved on Apr. 21, 2014.

"Combat e-mail viruses and spies", MIMEsweeper Review: PC User, Oct. 1996; retrieved on line http://www.web.archive.org/web/19970124231610/http://www.mimesweeper.integralis.com/Pr retrieved on Apr. 21, 2014.

MIMESweeper—Lexical Analysis: Prevents export of sensitive information, MIMESweeper, (Jan. 24, 1997) retrieved on line https://web.archive.org/web/19970124231116/http://www.mimesweeper.integralis.com/Pr retrieved on Apr. 21, 2014.

"MIMESweeper—Secure computing's editor's choice", MIMEsweeper Review: Secure Computing, Sep. 1996, retrieved on line https://web.archive.org/web/19970124231653/http://www.mimesweeper.integralis.com/Pr retrieved on Apr. 21, 2014.

MIMESweeper General FAQs: Starting MIMESweeper gives a 1025error, (Jan. 24, 1997) retrieved on line https://web.archive.org/web/19970124232051/http://www.mimesweeper.integralis.com/Te retrieved on Apr. 21, 2014.

MIMEsweeper—Virus Detection: Support for industry-standard AV tools, retrieved on line https://web.archive.org/web/19970124231045/http://www.mimesweeper.integralis.com/Pr retrieved on Apr. 21, 2014.

MIMESweeper—Supported Email Systems: MIMESweeper can operate with the following email systems, retrieved on line https://web.archive.org/web/19970124231019/http://www.mimesweeper.integralis.com/Pr retrieved on Apr. 21, 2014.

Zenkin, "Anti-virus software reports on windows registry changes", *Computer Fraud & Security*, p. 6 (2000).

Cho, et al., "Two sophisticated techniques to improve HMM-based intrusion detection systems", *LNCS, RAID 2003*, 2825:207-219 (2003).

Smaha, "Haystack: An intrusion detection system", IEEE, pp. 37-44 (1988).

Sekar, et al., "A specification-based approach for building survivable systems", *National Information Systems Security Conference*, 10 pages (1998).

Ramakrishnan, et al., "Model-based vulnerability analysis of computer systems", *Proceedings of the 2nd International Workshop on Verification, Model Checking and Abstract Interpretation*, 8 pages (1998).

(56) References Cited

OTHER PUBLICATIONS

Kephart, et al., "Automatic extraction of computer virus signatures", *Proceedings of the 4th Virus Bulletin International conference*, R. Ford ed., Virus Bulleting Ltd, Abingdon, England, pp. 179-194 (1994).

Javitz and Valdes, "The NIDES Statistical Component Description and Justification", *Annual Report, A010, Prepared for: Department of the Navy Space and Naval Warfare Systems Command*, 52 pages, (Mar. 7, 1994).

Hochberg, et al., "NADIR: A protype system for detecting network and file system abuse", Submitted to: *nformation Systems Security, Audit, and Control*, Brussels, Belgium, pp. 1-22 (Nov. 16-18, 1992).

Nachenberg, "Behavior Blocking: The next step in anti-virus protection", *Symantec Connect Community*, last updated Mar. 19, 2002; retrieved on line http://www.symantec.com/connect/articles/behavior-blocking-next-step-anti-virus-protection retrieved on May 11, 2014.

"Applications of Data Mining in Computer Security", edited by Daniel Barbara and Sushil Jajodia, *vol. 6 of Kluwer International Series on advances in Information Security*, 264 pages (2002).

Axelson, "A preliminary attempt to apply detection and estimation theory to intrusion detection", *Department of Computer Engineering Chalmers University of Technology*, Goteborg, Sweden, 11 pages (Mar. 13, 2000).

Lee, et al., "Real time data mining-based intrusion detection", *Proceedings of the 2001 DARPA Information Survivability Conference and Exposition (DISCEX II)*, 13 pages (2001).

ThunderBYTE Anti-Virus Utilities: User Manual,*ESSaSS B.V.*, 364 pages, (1996).

Mukkamala, et al., "Intrusion detection using an ensemble of intelligent paradigms", *Computer Application*, 28:167-182 (2005).

Liang, et al., "Isolated program execution: An application transparent approach for executing untrusted programs", *Proceedings of the 19th annual Computer Security Applications Conference*, 11 pages (2003).

Lee, et al., "A generic virus detection agent on the internet", *Proceedings of the 30th Annual Hawaii International Conference on System Sciences, IEEE*, vol. 4: 10 pages.

Lane, et al., "Approaches to online learning and concept drift for user identification in computer security", *AAAI Technical Report WS-98-07*, pp. 64-70 (1998).

Kruegel, et al., "On the detection of anomalous system call arguments", *Proceedings 8th European Symposium on Research in Computer Security (ESORICS'03)*, pp. 101-118 (2003).

Kolter, et al., "Dynamic weighted majority: A new ensemble method for tracking concept drift", *Proceedings of the Third International IEEE Conference on Data Mining*, pp. 123-130 (2003).

Klinkenberg, et al. "Detecting Concept Drift with support vector machines", *ICML '00 Proceedings of the 17th International Conference on Machine Learning*, pp. 487-494 (2000).

Islam, et al., "A constructive algorithm for training cooperative neural network ensembles", *IEEE Transactions on Neural Networks*, 14(4):820-834 (2003).

Hall, et al., "Comparing pure parallel ensemble creation techniques against bagging", *The Third IEEE International Conference on Data Mining Nov. 19-22, 2003*, 4 pages (2003).

Feng, et al., "Anomaly detection using call stack information", *Proceedings of the 2003 IEEE Symposium on Security and Privacy (SPO '03)*, 14 pages (2003).

Sekar, et al., "A fast automaton-based method for detecting anomalous program behaviors", *Proceedings of the 2001 IEEE Symposium on Security and Privacy*, 12 pages (2001).

Fan, et al., "Ensemble-based adaptive intrusion detection", *SIAM International Conference on Data Mining*, 18 pages (2002).

Dunlap, et al., "ReVirt: Enabling intrusion analysis through virtual-machine logging and replay", *Proceedings of the 2002 Symposium on Operating Systems Design and Implementation*, 14 pages (2002).

"The Digital Immune System: Enterprise-grade anti-virus automation in the 21st century", *Symantec*, 16 pages (2001).

Szor, "Attacks on Win32", *Virus Bulletin Conference*, pp. 57-84 (1998).

Szor, "Attacks on Win32—Part II", *Virus Bulletin Conference*, pp. 47-68 (2000).

"Press Release: Symantec's antivirus research center responds to mutating macro viruses with bloodhound-macro technology", *Symantec Corporation*, (Sep. 1997) retrieved on line http://www.symantec.com/about/news/release/article.jsp?prid=19970923_03 retrieved on Apr. 2, 2014 (4 pages).

"New Release: Symantec's Norton antivirus 4.0 delivers multi-platform support", Symantec Corporation, (Sep. 1997) retrieved on line https://www.symantec.com/press/1997/n970923b.html retrieved on Apr. 2, 2014 (3 pages).

Bergeron, et al., "Static detection of malicious code in executable programs", *International Journal of Requirement Engineering*, 8 pages (2001).

Bergeron, et al., "Static analysis of binary code to isolate malicious behaviors", *Proceedings IEEE 8th International Workshops on Enabling Technologies: Infrastructure for Collaborative Enterprises (WET ICE'99)*; Jun. 16-18, 1999; pp. 184-189, (1999).

"Understanding Heuristics: Symantec's Bloodhound Technology", *Symantec Corporation, Symantec White Paper Series*, vol. XXXIV, 17 pages, (1997).

Kerchen, et al., "Towards a testbed for malicious code detection", *IEEE*, pp. 160-166 (1991).

Burt, "Norton antivirus gold 5.0 review", *The Magazine of the Melbourne PC User Group*, (1999), (3 pages) retrieved on line http://www.melbpc.org.au/pcupdate/9902/9902article2.htm retrieved on Apr. 2, 2014.

"Press Release: Norton antivirus 5.0 deluxe eases online service and support", *Symantec Corporation*, (1998) retrieved on line http://www.symantec.com/about/news/release/article.jsp?prid=19981026_01 retrieved Apr. 2, 2014 (4 pages).

Nachenberg, "Staying ahead of the virus writers: An in-depth look at heuristics", *Virus Bulletin Conference*, pp. 85-98 (1998).

Lo, et al., "MCF: A Malicious Code Filter", *Computers and Security*, 14(6):541-566 (1995) (Work was supported by the US Dept. of Defense May 4, 1994).

Sahami, et al., "A Bayesian approach to filtering junk e-mail", *AAAI Workshop on Learning for Text Categorization*, 8 pages (1998).

Sahami, et al., Bayesian Spam Filter: A Bayesian approach to filtering junk e-mail, *Microsoft*, retrieved on line http://research.microsoft.com/en-us/um/people/horvits/junkfilter.htm, retrieved Apr. 11, 2014 (Abstract).

Arnold, et al., "Automatically generated Win32 heuristic virus detection", *Virus Bulletin Conference*, pp. 51-60 (2000).

Deitrich, "Ensemble Methods in Machine learning", *MCS 2000, LNCS 1857*, pp. 1-15 (2000).

"Multiple Classifier Systems", *Proceedings First International Workshop, MCS 2000, LNCS 1857*, Cagliari, Italy, Jun. 21-23, 2000, 411 pages (2000).

Chan, et al., "Toward parallel and distributed learning by Meta-learning", *AAAI Workshop in Knowledge Discovery in Databases*, 14 pages (1993).

Tsymbal, "The problem of concept drift: definitions and related work", Technical Report TCD-CS-2004-15, Department of Computer Science, Trinity College Dublin, Ireland, Apr. 2004 (available at http://www.cs.tcd.ie/publications/tech-reports/reports.04/TCD-CS-2004-15.pdf). (7 pages).

Sidiroglou, et al., "Building a reactive immune system for software services", *USENIX Annual Technical Conference*, 149-161 (2005).

Tandon, et al., "Learning rules from system call arguments and sequences for anomaly detection", *Workshop on Data Mining for Computer Security*, (10 pages) (2003).

Didaci, et al., "Ensemble learning for intrusion detection in computer networks", *Proceedings of the 8th Conference of the Italian Association of Artificial Intelligence (AIAA '02)*, (10 pages) (2002).

Chebrolu, et al., "Feature deduction and ensemble design of intrusion detection system", *Computers & Security*, 24:295-307 (2005).

Chaturvedi, et al., "Improving attack detection in host-based IDS by learning properties of system call arguments", *Proceedings of the IEEE Symposium on Security and Privacy*, (19 pages) (2005).

(56) References Cited

OTHER PUBLICATIONS

Breiman, "Random forests", *Statistics Department, University of California*, (35 pages) (1999).
Breiman, "Bagging predictors", *Machine Learning*, 24:123-140 (1996).
Bowyer, et al., "A parallel decision tree builder for mining very large visualization datasets", *IEEE International Conference on Systems, Man, and Cybernetics*, (6 pages) (2000).
Bauer, et al., "An empirical comparison of voting classification algorithms: Bagging, boosting, and variants", *Machine Learning*, 36:105-142 (1999).
Viljanen, "A survey of application level intrusion detection", Department of Computer Science, University of Helsinki, *Technical Report, Series of Publications C, Report C-2004-61*, (35 pages) (2004).
Cardinale, et al., "A constructive induction approach to computer immunology", *Thesis Presented to the Faculty of the Graduate School of Engineering of the Air Force Institute of Technology Air University, Air Education and Training Command*, (243 pages) (1999).
Kephart, et al., "Biologically inspired defenses against computer viruses", *International Conference on Artificial Intelligence*, pp. 985-996 (1995).
Androutsopoulos, et al., "An evaluation of naive Bayesian anti-spam filter", *Proceedings of the workshop on Machine Learning in the New Information Age*, G. Potamias, V. Moustakis and M. van Someren (eds.), 11th European Conference on Machine Learning, Barcelona, Spain, pp. 9-17 (2000).
Damp, "An analysis of the effectiveness of a constructive induction-based virus detection prototype", *Air Force Inst. of Tech. Wright-Patterson AFB OH, Accession No. ADA380616*, Apr. 2000 (Abstract).
Cohen, "Learning tress and rules with set-valued features", *Proceedings of the 13th National Conference on Artificial Intelligence (AAAI-96)*, (9 pages) (1996).
Wilding, "Virus Bulletin: The authoritative international publication on computer virus prevention, recognition and removal", *Virus Bulletin Ltd.*, (20 pages) (1990).
Yeung, et al., "Host-based intrusion detection using dynamic and static behavioral models", *Department of Computer Science Hong Kong University of Science and Technology*, (34 pages) (Nov. 22, 2001).
Ye, "A Markov chain model of temporal behavior for anomaly detection", *Proceedings of the 2000 IEEE Workshop on Information Assurance and Security*, US Military Academy, pp. 171-174 (2000)).
Lee, et al., "A data mining framework for constructing features and models for intrusion detection systems", *Doctor of Philosophy in the Graduate School of Arts and Sciences, Columbia University*, (193 pages) (1999).
Valcarce, et al., "ESSENCE: An experiment in knowledge-based security monitoring and control", *UNIX Security Symposium III Proceedings*, (18 pages) (Sep. 14-16, 1992).
Tripwire Intrusion Detection System 1.3 for LINUX User Manual, *Tripwire, Inc.* (46 pages) (Jul. 27, 1998).
Tripwire for Servers 2.4 User Guide, *Tripwire, Inc.*, (101 pages) (2001).
Tripwire 2.4 Reference Guide, *Tripwire, Inc.*, (127 pages) (2001).
Teng, et al., "Adaptive real-time anomaly detection using inductively generated sequential patterns", *IEEE*, pp. 278-284 (1990).
SunSHIELD Basic Security Module (BSM) Guide, *Sun Microsystems*, (239 pages) (2000).
SunSHIELD Basic Security Module (BSM) Guide, *Sun Microsystems*, (195 pages) (1995).
Shavlik, et al., "Evaluating software sensors for actively profiling windows 2000 computer users", *RAID*, (7 pages) (2001).
Schwartzbard, et al., "A study in the feasibility of performing host-based anomaly detection on windows NT", *Proceedings of the 2nd International Workshop on Recent Advances in Intrusion Detection*, (10 pages) (Sep. 7-9, 1999).
Schonlau, et al., "Detecting masquerades in intrusion detection based on unpopular commands", *Information Processing Letters*, 76:33-38 (2000).
Schonlau, et al., "Computer Intrusion: Detecting Masquerades", *Statistical Science*, 16(1):58-74 (2001).
Murray, "Windows NT event logging", *O'Reilly & Associates, Inc.*, (320 pages) (1998).
Masys, et al., "Protecting clinical data on web client computers: The PCASSO approach", *AMIA, Inc.*, pp. 366-370 (1998).
Mahoney, et al., "Detecting novel attacks by identifying anomalous network packet headers", *Florida Institute of Technology Technical Report CS-2001-2, Department of Computer Sciences Florida Institute of Technology*, (10 pages) (2001).
Lunt, "A survey of intrusion detection techniques", *Computers & Security*, 12:405-418 (1993).
Liao, et al., "Using text categorization techniques for intrusion detection", *Proceedings USENIX Security*, pp. 51-59 (2002).
Li, et al., "Decision tree classifiers for computer intrusion detection", *Parallel and Distributed Computing Practices*, 4(2):179-190 (2001).
LaPadula, "CyberSecurity Monitoring Tools and Projects: A compendium of commercial and government tools and government research projects", *MITRE Center for Integrated Intelligence Systems (MP 00B0000018 Reviosn 3)*, (127 pages) (2000).
Kremer, "Thesis: Real-time intrusion detection for windows NT based on Navy IT-21 audit policy", *Naval Postgraduate School*, Monterey, California, (61 pages) (Sep. 1999).
Korba, "Windows NT attacks for the evaluation of intrusion detection systems", *Massachusetts Institute of Technology*, (102 pages) (2000).
Kim, et al., "Writing, supporting, and evaluating tripwire: A publically available security tool", *Computer Science Technical Reports*, Paper 1122 (25 pages) (1994).
Kim, et al., "The design and implementation of tripwire: A file system integrity checker", *Computer Science Technical Reports*, Paper 1084 (23 pages) (1993).
Kim, et al., "Experiences with tripwire: Using integrity checkers for intrusion detection", *Computer Science Technical Reports*, Paper 1115 (15 pages) (1994).
"Kane Security Analyst Features & Benefits", *Kane Security Analyst*, Intrusion.com, Inc., (2000).
"Intrusion.com Products: Enterprise" retrieved on line https://web.archive.org/web/20010214040305/http://www.intrusion.com/Products/enterprise.shtml, Kane Secure Enterprise, Intrusion.com Inc., (2001) (symco100204438).
Intrusion.com Products: Features retrieved on line https://web.archive.org/web/20010215021519/http://www.intrusion.com/Products/kse_features.shtml, Kane Secure Enterprise, Intrusion.com, Inc., (2001).
"Kane Security Detecting Administrator and Super user Misuse", *Kane Secure Enterprise*, Intrusion.com, Inc., (2000).
"Kane Security Detecting Stolen Passwords", *Kane Secure Enterprise*, Intrusion.com, Inc., (2000).
"Advancing the Art of Intrusion Detection: The KSE behavioral profiling system", *Kane Secure Enterprise*, Intrusion.com, Inc., pp. 1-5 (2000).
Hosmer, "Time-lining computer evidence", *IEEE*, pp. 109-112 (1998).
Hoglund, et al., "The "ESSENSE" of intrusion detection: A knowledge-based approach to security monitoring and control", *Proceedings of the 7th International Conference*, Austin, Texas, pp. 201-210 (May 31-Jun. 3, 1994).
Hedbom, et al., "Analysis of the security of windows NT", *Department of Computer Engineering, Chalmers University of Technology*, (97 pages) (1999).
Hedbom, et al., "A security evaluation of a non-distributed version of windows NT", *Proceedings of the 2nd Nordic Workshop on Secure Computer Systems (NORDSEC '97)*, Epoo, Finland, (29 pages) (1997).
Ghosh, et al., "Using program behavior profiles for intrusion detection", *Proceedings of the SANS 3rd Conference on Workshop on Intrusion Detection and Network Monitoring*, (7 pages) (1999).
Ghosh, et al., "Two state-based approaches to program-based anomaly detection", *ACSAC '00 Proceedings of the 16th Annual Computer Security Applications*, pp. 21-30 (2000).

(56) References Cited

OTHER PUBLICATIONS

Ghosh, et al., "Learning program behavior profiles for intrusion detection", *Proceedings of the Workshop on Intrusion Detection and network Monitoring*, (13 pages) (Apr. 9-12, 1999).
Ghosh, et al., "Detecting anomalous and unknown intrusions against programs", *Proceedings of the 14th Annual Computer Security Applications Conference*, Phoenix, IEEE Computer Society Press, Los Alamitos, CA, pp. 259-267 (1998).
Friedman, et al., "Efficient Bayesian parameter estimation in large discrete domains", *Advances in Neural Information Processing Systems, MIT Press*, (7 pages) (1999).
Forest, et al., "Self-nonself discrimination in a computer", *Proceedings of 1994 IEEE Symposium on Research in Security and Privacy*, (12 pages) (1994).
Flack, et al., "A toolkit for modeling and compressing audit data", *Purdue University, COAST Laboratory*, (25 pages) (1999).
Hollander, "The future of web server security", *Entercept Security Technologies, Entercept Web Server Edition*, (10 pages) (2001).
Endler, et al., "FOCUS on Intrusion Detection: Intrusion detection using Solaris' basic security module", retrieved on line http://www.securityfocus.com/focus/ids/articles/idsbsm.html, retrieved on Oct. 17, 2000.
Endler, "Intrusion detection applying machine learning to Solaris audit data", *Proceedings of the 1998 Annual Computer Security Application Conference (ACSAC)*, Los Alamitos, CA, pp. 268-279 (1998).
DuMouchel, "Computer intrusion detection based on Bayes factors for comparing command transition probabilities", *National Institute of Statistical Sciences (NISS)*, Technical Report No. 91 (13 pages) (1999).
Du, et al., "Security relevancy analysis on the registry of windows NT 4.0", *Proceedings of the 15th Annual Computer Security Applications Conference (ACSAC'99)*, IEEE Computer Society, pp. 331-338 (1999).
Debbabi, et al., "Monitoring of Malicious activity in software systems", *Symposium on Requirements Engineering for Information Security (SREIS)*, (15 pages) (2001).
Dasgupta, "Immunity-based intrusion detection system: A general framework", *Proceedings of 22nd National Information Systems Security Conference*, Arlington, VA, pp. 147-160 (1999).
"A data mining approach for building cost-sensitive and light intrusion detection models—Quarterly Review—Nov. 2000", *North Carolina State University, Columbia University and Florida Institute of Technology*, (90 pages) (2000).
Cohen, "Fast effective rule induction", *Machine Learning: Proceedings of the 12th International Conference*, pp. 115-123 (1995).
Cannady, "An adaptive neural network approach to intrusion detection and response", *School of Computer and Information Sciences Nova Southeastern University*, (181 pages) (2000).
Bell, et al., "Modeling for text compression", *ACM Computing Survey*, 21(4):557-591 (1989).
Burns, "Intrusion detection in real time in a multi-node, multi-host environment", *Naval Postgraduate School*, (106 pages) (1997).
Bace, "Technology Series: Intrusion detection", *Macmillan Technical Publishing USA*, (365 pages) (2000).
Axelson, "Research in intrusion-detection systems: A survey", *Department of Computer Engineering Chalmers University of Technology*, (93 pages) (Dec. 15, 1998; revised Aug. 19, 1999).
Webb, "Statistical pattern recognition, second edition", *John Wiley & Sons, Ltd.*, (504 pages) (2002).
Webb, "Statistical pattern recognition", *Arnold Publishers and co-published by Oxford university Press Inc.*, (14 pages) (1999).
Mitchell, "Machine learning", *McGraw-Hill Science/Engineering/Math*, (421 pages) (1997).
Langley, "Elements of machine learning", *Morgan Kaufmann Publishers, Inc.*, Chapter 4; Induction of Competitive Concepts, pp. 104-112 (12 pages) (1996).
Hruska, "Computer viruses and anti-virus warfare", *Ellis Horwood Limited*, Chapter 4 (12 pages) (1990).

Prodromidis, et al., "Agent-based distributed learning applied to fraud detection", *Technical Report CUCS-014-99*, Columbia University, (8 pages) (1999).
Buschkes, et al., "How to increase security in mobile networks by anomaly detection", *Proceedings of the 14th Annual computer Security Applications Conference, ACM Special Interest Group on Security, Audit and control*, Phoenix, AZ, (10 pages) (1998).
Lee, et al., "A data mining framework for building intrusion detection models", *Proceedings 1999 IEEE Symposium on Security and Privacy*, pp. 120-132 (1999).
Fan, "Systematic data selection to mine concept-drifting data streams", *ACM KDD '04*, pp. 128-137 (2004).
MIMESweeper System Requirements, (Jan. 24, 1997) retrieved on line https://web.archive.org/web/19970124231030/http://www.mimesweeper.integralis.com/Pr . . . , retrieved on Apr. 21, 2014.
MIMESweeper FAQ: What email system does MIMEsweeper support? (Jan. 24, 1997) retrieved on line https://web.archive.org/web/19970124231813/http://www.mimesweeper.integralis.com/Pr . . . , retrieved on Apr. 21, 2014.
MIMESweeper FAQ: Can MIMESweeper check internal email?, (Jan. 24, 1997), retrieved on line https://web.archive.org/web/19970124231748/http://www.mimesweeper.integralis.com/Pr . . . , retrieved on Apr. 21, 2014.
MIMESweeper FAQ: What hardware and software do I need to run MIMESweeper?, (Jan. 24, 1997), retrieved on line https://web.archive.org/web/19970124232002/http://www.mimesweeper.integralis.com/Pr . . . , retrieved on Apr. 21, 2014.
MIMESweeper FAQ: What is MIMESweeper and why do I need it? (Jan. 24, 1997), retrieved on line https://web.archive.org/web/19970124231725/http://www.mimesweeper.integralis.com/Pr . . . , retrieved on Apr. 21, 2014.
MIMESweeper FAQ: What platform does MIMESweeper work on? (Jan. 24, 1997), retrieved on line https://web.archive.org/web/19970124231738/http://vvww.mimesweeper.integralis.com/Pr . . . , retrieved on Apr. 21, 2014.
MIMESweeper FAQ: Where in my email system would MIMESweeper sit? (Jan. 24, 1997), retrieved on line https://web.archive.org/web/19970124231823/http://www.mimesweeper.integralis.com/Pr . . . , retrieved on Apr. 21, 2014.
MIMESweeper FAQ: Why do I need it if I already have a firewall and desktop products?, (Jan. 24, 1997), retrieved on line https://web.archive.org/web/19970124231758/http://www.mimesweeper.integralis.com/Pr . . . , retrieved on Apr. 21, 2014.
MIMESweeper, Why Windows NT?: Why we built MIMESweeper to run under Windows NT, (Jan. 24, 1997), retrieved on line https://web.archive.org/web/19970124232043/http://www.mimesweeper.integralis.com/Te . . . , retrieved on Apr. 21, 2014.
MIMESweeper: Email message content security, (Jan. 24, 1997), retrieved on line https://web.archive.org/web/19970124231006/http://www.mimesweeper.integralis.com/Pr . . . , retrieved on Apr. 21, 2014.
MIMESweeper: Glossary of terms used in MIMESweeper, (Jan. 24, 1997), retrieved on line https://web.archive.org/web/19970124230731/http://www.mimesweeper.integralis.com/G1 . . . , retrieved on Apr. 21, 2014.
MIMESweeper FAQ: How long does MIMESweeper take to process a message?, (Jan. 24, 1997), retrieved on line https://web.archive.org/web/1997012431858/http://www.mimesweeper.integralis.com/Pr . . . , retrieved on Apr. 21, 2014.
MIMESweeper FAQ: How much administration does MIMESweeper require?, (Jan. 24, 1997), retrieved on line https://web.archive.org/web/19970124232010/http://www.mimesweeper.integralis.com/Pr . . . , retrieved on Apr. 21, 2014.
MIMESweeper: It works with MIMESweeper, (Jan. 24, 1997) retrieved on line https://web.archive.org/web/19970124230641/http://www.mimesweeper.integralis.com/W . . . , retrieved on Apr. 21, 2014.
MIMESweeper cc: Mail FAQs, (Jan. 24, 1997), retrieved on line https://web.archive.org/web/19970124232103/http://www.mimesweeper.integralis.com/Te . . . , retrieved on Apr. 21, 2014.

(56) References Cited

OTHER PUBLICATIONS

MIMESweeper: Product Description: Check out the MIMESweeper FAQ, (Jan. 24, 1997), retrieved on line https://web.archive.org/web/19970124230632/http://www.mimesweeper.integralis.com/Pr . . . , retrieved on Apr. 21, 2014.
Virus Bulletin, ISSN 0956-9979 (Entire article, 16 pages) (Aug. 1989).
Virus Bulletin, ISSN 0956-9979 (Entire article, 16 pages) (Jul. 1989).
Virus Bulletin, ISSN 0956-9979 (Entire article, 16 pages) (Sep. 1989).
Virus Bulletin, ISSN 0956-9979 (Entire article, 20 pages) (Oct. 1989).
Virus Bulletin, ISSN 0956-9979 (Entire article, 20 pages) (Nov. 1989).
Virus Bulletin, ISSN 0956-9979 (Entire article, 18 pages) (Dec. 1989).
Virus Bulletin, ISSN 0956-9979 (Entire article, 20 pages) (Feb. 1990).
Virus Bulletin, ISSN 0956-9979 (Entire article, 16 pages) (Mar. 1990).
Virus Bulletin, ISSN 0956-9979 (Entire article, 20 pages) (Apr. 1990).
Virus Bulletin, ISSN 0956-9979 (Entire article, 20 pages) (May 1990).
Virus Bulletin, ISSN 0956-9979 (Entire article, 20 pages) (Jun. 1990).
Virus Bulletin, ISSN 0956-9979 (Entire article, 20 pages) (Jul. 1990).
Virus Bulletin, ISSN 0956-9979 (Entire article, 24 pages) (Aug. 1990).
Virus Bulletin, ISSN 0956-9979 (Entire article, 24 pages) (Sep. 1990).
Virus Bulletin, ISSN 0956-9979 (Entire article, 20 pages) (Oct. 1990).
Virus Bulletin, ISSN 0956-9979 (Entire article, 24 pages) (Nov. 1990).
Virus Bulletin, ISSN 0956-9979 (Entire article, 24 pages) (Dec. 1990).
Virus Bulletin, ISSN 0956-9979 (Entire article, 28 pages) (Jan. 1991).
Virus Bulletin, ISSN 0956-9979 (Entire article, 20 pages) (Feb. 1991).
Virus Bulletin, ISSN 0956-9979 (Entire article, 20 pages) (Mar. 1991).
Virus Bulletin, ISSN 0956-9979 (Entire article, 28 pages) (Apr. 1991).
Virus Bulletin, ISSN 0956-9979 (Entire article, 20 pages) (May 1991).
Virus Bulletin, ISSN 0956-9979 (Entire article, 24 pages) (Jun. 1991).
Virus Bulletin, ISSN 0956-9979 (Entire article, 44 pages) (Jul. 1991).
Virus Bulletin, ISSN 0956-9979 (Entire article, 28 pages) (Aug. 1991).
Virus Bulletin, ISSN 0956-9979 (Entire article, 24 pages) (Sep. 1991).
Virus Bulletin, ISSN 0956-9979 (Entire article, 28 pages) (Oct. 1991).
Virus Bulletin, ISSN 0956-9979 (Entire article, 24 pages) (Nov. 1991).
Virus Bulletin, ISSN 0956-9979 (Entire article, 28 pages) (Dec. 1991).
Virus Bulletin, ISSN 0956-9979 (Entire article, 24 pages) (Jan. 1992).
Virus Bulletin, ISSN 0956-9979 (Entire article, 28 pages) (Feb. 1992).
Virus Bulletin, ISSN 0956-9979 (Entire article, 24 pages) (Mar. 1992).
Virus Bulletin, ISSN 0956-9979 (Entire article, 28 pages) (Apr. 1992).
Virus Bulletin, ISSN 0956-9979 (Entire article, 24 pages) (May 1992).
Virus Bulletin, ISSN 0956-9979 (Entire article, 28 pages) (Jun. 1992).
Virus Bulletin, ISSN 0956-9979 (Entire article, 20 pages) (Jul. 1992).
Virus Bulletin, ISSN 0956-9979 (Entire article, 28 pages) (Aug. 1992).
Virus Bulletin, ISSN 0956-9979 (Entire article, 24 pages) (Sep. 1992).
Virus Bulletin, ISSN 0956-9979 (Entire article, 24 pages) (Oct. 1992).
Virus Bulletin, ISSN 0956-9979 (Entire article, 28 pages) (Nov. 1992).
Virus Bulletin, ISSN 0956-9979 (Entire article, 24 pages) (Dec. 1992).
Virus Bulletin, ISSN 0956-9979 (Entire article, 24 pages) (Jan. 1993).
Virus Bulletin, ISSN 0956-9979 (Entire article, 24 pages) (Feb. 1993).
Virus Bulletin, ISSN 0956-9979 (Entire article, 24 pages) (Mar. 1993).
Virus Bulletin, ISSN 0956-9979 (Entire article, 24 pages) (Apr. 1993).
Virus Bulletin, ISSN 0956-9979 (Entire article, 24 pages) (May 1993).
Virus Bulletin, ISSN 0956-9979 (Entire article, 24 pages) (Jun. 1993).
Virus Bulletin, ISSN 0956-9979 (Entire article, 24 pages) (Jul. 1993).
Virus Bulletin, ISSN 0956-9979 (Entire article, 24 pages) (Aug. 1993).
Virus Bulletin, ISSN 0956-9979 (Entire article, 24 pages) (Sep. 1993).
Virus Bulletin, ISSN 0956-9979 (Entire article, 20 pages) (Oct. 1993).
Virus Bulletin, ISSN 0956-9979 (Entire article, 24 pages) (Nov. 1993).
Virus Bulletin, ISSN 0956-9979 (Entire article, 24 pages) (Dec. 1993).
Virus Bulletin, ISSN 0956-9979 (Entire article, 24 pages) (Jan. 1994).
Virus Bulletin, ISSN 0956-9979 (Entire article, 24 pages) (Feb. 1994).
Virus Bulletin, ISSN 0956-9979 (Entire article, 24 pages) (Mar. 1994).
Virus Bulletin, ISSN 0956-9979 (Entire article, 24 pages) (Apr. 1994).
Virus Bulletin, ISSN 0956-9979 (Entire article, 24 pages) (May 1994).
Virus Bulletin, ISSN 0956-9979 (Entire article, 24 pages) (Jun. 1994).
Virus Bulletin, ISSN 0956-9979 (Entire article, 24 pages) (Jul. 1994).
Virus Bulletin, ISSN 0956-9979 (Entire article, 24 pages) (Aug. 1994).
Virus Bulletin, ISSN 0956-9979 (Entire article, 24 pages) (Sep. 1994).
Virus Bulletin, ISSN 0956-9979 (Entire article, 24 pages) (Oct. 1994).
Virus Bulletin, ISSN 0956-9979 (Entire article, 24 pages) (Nov. 1994).
Virus Bulletin, ISSN 0956-9979 (Entire article, 24 pages) (Dec. 1994).
Virus Bulletin, ISSN 0956-9979 (Entire article, 24 pages) (Jan. 1995).
Virus Bulletin, ISSN 0956-9979 (Entire article, 24 pages) (Feb. 1995).
Virus Bulletin, ISSN 0956-9979 (Entire article, 24 pages) (Mar. 1995).
Virus Bulletin, ISSN 0956-9979 (Entire article, 24 pages) (Apr. 1995).
Virus Bulletin, ISSN 0956-9979 (Entire article, 24 pages) (May 1995).
Virus Bulletin, ISSN 0956-9979 (Entire article, 24 pages) (Jun. 1995).
Virus Bulletin, ISSN 0956-9979 (Entire article, 24 pages) (Jul. 1995).

(56) References Cited

OTHER PUBLICATIONS

Virus Bulletin, ISSN 0956-9979 (Entire article, 24 pages) (Aug. 1995).
Virus Bulletin, ISSN 0956-9979 (Entire article, 24 pages) (Sep. 1995).
Virus Bulletin, ISSN 0956-9979 (Entire article, 24 pages) (Oct. 1995).
Virus Bulletin, ISSN 0956-9979 (Entire article, 24 pages) (Nov. 1995).
Virus Bulletin, ISSN 0956-9979 (Entire article, 24 pages) Dec. 1995).
Virus Bulletin, ISSN 0956-9979 (Entire article, 24 pages) (Jan. 1996).
Virus Bulletin, ISSN 0956-9979 (Entire article, 24 pages) (Feb. 1996).
Virus Bulletin, ISSN 0956-9979 (Entire article, 24 pages) (Mar. 1996).
Virus Bulletin, ISSN 0956-9979 (Entire article, 24 pages) (Apr. 1996).
Virus Bulletin, ISSN 0956-9979 (Entire article, 24 pages) (May 1996).
Virus Bulletin, ISSN 0956-9979 (Entire article, 32 pages) (Jun. 1996).
Virus Bulletin, ISSN 0956-9979 (Entire article, 28 pages) (Jul. 1996).
Virus Bulletin, ISSN 0956-9979 (Entire article, 24 pages) (Aug. 1996).
Virus Bulletin, ISSN 0956-9979 (Entire article, 24 pages) (Sep. 1996).
Virus Bulletin, ISSN 0956-9979 (Entire article, 24 pages) (Oct. 1996).
Virus Bulletin, ISSN 0956-9979 (Entire article, 24 pages) (Nov. 1996).
Virus Bulletin, ISSN 0956-9979 (Entire article, 24 pages) (Dec. 1996).
Virus Bulletin, ISSN 0956-9979 (Entire article, 24 pages) (Jan. 1997).
Virus Bulletin, ISSN 0956-9979 (Entire article, 24 pages) (Feb. 1997).
Virus Bulletin, ISSN 0956-9979 (Entire article, 24 pages) (Mar. 1997).
Virus Bulletin, ISSN 0956-9979 (Entire article, 24 pages) (Apr. 1997).
Virus Bulletin, ISSN 0956-9979 (Entire article, 28 pages) (May 1997).
Virus Bulletin, ISSN 0956-9979 (Entire article, 24 pages) (Jun. 1997).
Virus Bulletin, ISSN 0956-9979 (Entire article, 24 pages) (Jul. 1997).
Virus Bulletin, ISSN 0956-9979 (Entire article, 24 pages) (Aug. 1997).
Virus Bulletin, ISSN 0956-9979 (Entire article, 24 pages) (Sep. 1997).
Virus Bulletin, ISSN 0956-9979 (Entire article, 24 pages) (Oct. 1997).
Virus Bulletin, ISSN 0956-9979 (Entire article, 20 pages) (Nov. 1997).
Virus Bulletin, ISSN 0956-9979 (Entire article, 16 pages) (Dec. 1997).
Virus Bulletin, ISSN 0956-9979 (Entire article, 28 pages) (Jan. 1998).
Virus Bulletin, ISSN 0956-9979 (Entire article, 24 pages) (Feb. 1998).
Virus Bulletin, ISSN 0956-9979 (Entire article, 24 pages) (Mar. 1998).
Virus Bulletin, ISSN 0956-9979 (Entire article, 24 pages) (Apr. 1998).
Virus Bulletin, ISSN 0956-9979 (Entire article, 28 pages) (May 1998).
Virus Bulletin, ISSN 0956-9979 (Entire article, 24 pages) (Jun. 1998).
Virus Bulletin, ISSN 0956-9979 (Entire article, 24 pages) (Jul. 1998).
Virus Bulletin, ISSN 0956-9979 (Entire article, 24 pages) (Aug. 1998).
Virus Bulletin, ISSN 0956-9979 (Entire article, 24 pages) (Sep. 1998).
Virus Bulletin, ISSN 0956-9979 (Entire article, 24 pages) (Oct. 1998).
Virus Bulletin, ISSN 0956-9979 (Entire article, 24 pages) (Nov. 1998).
Virus Bulletin, ISSN 0956-9979 (Entire article, 20 pages) (Dec. 1998).
Virus Bulletin, ISSN 0956-9979 (Entire article, 20 pages) (Jan. 1999).
Virus Bulletin, ISSN 0956-9979 (Entire article, 24 pages) (Feb. 1999).
Virus Bulletin, ISSN 0956-9979 (Entire article, 24 pages) (Mar. 1999).
Virus Bulletin, ISSN 0956-9979 (Entire article, 24 pages) (Apr. 1999).
Virus Bulletin, ISSN 0956-9979 (Entire article, 24 pages) (May 1999).
Virus Bulletin, ISSN 0956-9979 (Entire article, 24 pages) (Jun. 1999).
Virus Bulletin, ISSN 0956-9979 (Entire article, 24 pages) (Jul. 1999).
Virus Bulletin, ISSN 0956-9979 (Entire article, 24 pages) (Aug. 1999).
Virus Bulletin, ISSN 0956-9979 (Entire article, 24 pages) (Sep. 1999).
Virus Bulletin, ISSN 0956-9979 (Entire article, 24 pages) (Oct. 1999).
Virus Bulletin, ISSN 0956-9979 (Entire article, 24 pages) (Nov. 1999).
Virus Bulletin, ISSN 0956-9979 (Entire article, 24 pages) (Dec. 1999).
Virus Bulletin, ISSN 0956-9979 (Entire article, 24 pages) (Jan. 2000).
Virus Bulletin, ISSN 0956-9979 (Entire article, 24 pages) (Feb. 2000).
Virus Bulletin, ISSN 0956-9979 (Entire article, 24 pages) (Mar. 2000).
Virus Bulletin, ISSN 0956-9979 (Entire article, 24 pages) (Apr. 2000).
Virus Bulletin, ISSN 0956-9979 (Entire article, 24 pages) (May 2000).
Virus Bulletin, ISSN 0956-9979 (Entire article, 24 pages) (Jun. 2000).
Virus Bulletin, ISSN 0956-9979 (Entire article, 24 pages) (Jul. 2000).
Virus Bulletin, ISSN 0956-9979 (Entire article, 24 pages) (Aug. 2000).
Virus Bulletin, ISSN 0956-9979 (Entire article, 24 pages) (Sep. 2000).
Virus Bulletin, ISSN 0956-9979 (Entire article, 24 pages) (Oct. 2000).
Virus Bulletin, ISSN 0956-9979 (Entire article, 24 pages) (Nov. 2000).
Virus Bulletin, ISSN 0956-9979 (Entire article, 24 pages) (Dec. 2000).
Virus Bulletin, ISSN 0956-9979 (Entire article, 24 pages) (Jan. 2001).
Virus Bulletin, ISSN 0956-9979 (Entire article, 24 pages) (Feb. 2001).
Virus Bulletin, ISSN 0956-9979 (Entire article, 24 pages) (Mar. 2001).
Virus Bulletin, ISSN 0956-9979 (Entire article, 24 pages) (Apr. 2001).
Virus Bulletin, ISSN 0956-9979 (Entire article, 24 pages) (May 2001).
Virus Bulletin, ISSN 0956-9979 (Entire article, 24 pages) (Jun. 2001).
Virus Bulletin, ISSN 0956-9979 (Entire article, 24 pages) (Jul. 2001).
Virus Bulletin, ISSN 0956-9979 (Entire article, 24 pages) (Aug. 2001).
Virus Bulletin, ISSN 0956-9979 (Entire article, 24 pages) (Sep. 2001).

(56) References Cited

OTHER PUBLICATIONS

Virus Bulletin, ISSN 0956-9979 (Entire article, 24 pages) (Oct. 2001).
Virus Bulletin, ISSN 0956-9979 (Entire article, 24 pages) (Nov. 2001).
Virus Bulletin, ISSN 0956-9979 (Entire article, 24 pages) (Dec. 2001).
Virus Bulletin, ISSN 0956-9979 (Entire article, 24 pages) (Jan. 2002).
Virus Bulletin, ISSN 0956-9979 (Entire article, 24 pages) (Feb. 2002).
Virus Bulletin, ISSN 0956-9979 (Entire article, 24 pages) (Mar. 2002).
Virus Bulletin, ISSN 0956-9979 (Entire article, 24 pages) (Apr. 2002).
Virus Bulletin, ISSN 0956-9979 (Entire article, 24 pages) (May 2002).
Virus Bulletin, ISSN 0956-9979 (Entire article, 24 pages) (Jun. 2002).
Virus Bulletin, ISSN 0956-9979 (Entire article, 24 pages) (Jul. 2002).
Virus Bulletin, ISSN 0956-9979 (Entire article, 24 pages) (Aug. 2002).
Virus Bulletin, ISSN 0956-9979 (Entire article, 24 pages) (Sep. 2002).
Virus Bulletin, ISSN 0956-9979 (Entire article, 24 pages) (Oct. 2002).
Virus Bulletin, ISSN 0956-9979 (Entire article, 24 pages) (Nov. 2002).
Virus Bulletin, ISSN 0956-9979 (Entire article, 24 pages) (Dec. 2002).
Virus Bulletin, ISSN 0956-9979 (Entire article, 24 pages) (Jan. 2003).
Virus Bulletin, ISSN 0956-9979 (Entire article, 24 pages) (Feb. 2003).
Virus Bulletin, ISSN 0956-9979 (Entire article, 24 pages) (Mar. 2003).
Virus Bulletin, ISSN 0956-9979 (Entire article, 24 pages) (Apr. 2003).
Virus Bulletin, ISSN 0956-9979 (Entire article, 24 pages) (May 2003).
Virus Bulletin, ISSN 0956-9979 (Entire article, 24 pages) (Jun. 2003).
Virus Bulletin, ISSN 0956-9979 (Entire article, 24 pages) (Jul. 2003).
Virus Bulletin, ISSN 0956-9979 (Entire article, 24 pages) (Aug. 2003).
Virus Bulletin, ISSN 0956-9979 (Entire article, 24 pages) (Sep. 2003).
Virus Bulletin, ISSN 0956-9979 (Entire article, 24 pages) (Oct. 2003).
Virus Bulletin, ISSN 0956-9979 (Entire article, 24 pages) (Nov. 2003).
Virus Bulletin, ISSN 0956-9979 (Entire article, 24 pages) (Dec. 2003).
Virus Bulletin, ISSN 0956-9979 (Entire article, 24 pages) (Jan. 2004).
Virus Bulletin, ISSN 0956-9979 (Entire article, 24 pages) (Feb. 2004).
Virus Bulletin, ISSN 0956-9979 (Entire article, 24 pages) (Mar. 2004).
Virus Bulletin, ISSN 0956-9979 (Entire article, 24 pages) (Apr. 2004).
Virus Bulletin, ISSN 0956-9979 (Entire article, 24 pages) (May 2004).
Virus Bulletin, ISSN 0956-9979 (Entire article, 24 pages) (Jun. 2004).
Virus Bulletin, ISSN 0956-9979 (Entire article, 24 pages) (Jul. 2004).
Virus Bulletin, ISSN 0956-9979 (Entire article, 24 pages) (Aug. 2004).
Virus Bulletin, ISSN 0956-9979 (Entire article, 24 pages) (Sep. 2004).
Virus Bulletin, ISSN 0956-9979 (Entire article, 24 pages) (Oct. 2004).
Virus Bulletin, ISSN 0956-9979 (Entire article, 24 pages) (Nov. 2004).
Virus Bulletin, ISSN 0956-9979 (Entire article, 24 pages) (Dec. 2004).
Virus Bulletin, ISSN 0956-9979 (Entire article, 24 pages) (Jan. 2005).
Virus Bulletin, ISSN 0956-9979 (Entire article, 24 pages) (Feb. 2005).
Virus Bulletin, ISSN 0956-9979 (Entire article, 24 pages) (Mar. 2005).
Virus Bulletin, ISSN 0956-9979 (Entire article, 24 pages) (Apr. 2005).
Virus Bulletin, ISSN 0956-9979 (Entire article, 24 pages) (May 2005).
Virus Bulletin, ISSN 0956-9979 (Entire article, 24 pages) (Jun. 2005).
Virus Bulletin, ISSN 0956-9979 (Entire article, 24 pages) (Jul. 2005).
Virus Bulletin, ISSN 0956-9979 (Entire article, 24 pages) (Aug. 2005).
Virus Bulletin, ISSN 0956-9979 (Entire article, 24 pages) (Sep. 2005).
Virus Bulletin, ISSN 0956-9979 (Entire article, 24 pages) (Oct. 2005).

* cited by examiner

| date | user | computer | action | cat | ty | string 1 | string 2 | string 3 |
|---|---|---|---|---|---|---|---|---|
| Nov 27, 2000 | SYSTEM | PEACH | 515 | 1 | 8 | Service Co... | | |
| Nov 27, 2000 | SYSTEM | PEACH | 592 | 5 | 8 | 2155948800 | SPOOLSS... | 2156310656 |
| Nov 27, 2000 | SYSTEM | PEACH | 592 | 5 | 8 | 2155926656 | dtocsrvc.exe | 2156310656 |
| Nov 27, 2000 | SYSTEM | PEACH | 592 | 5 | 8 | 2155884576 | startup.exe | 2155926656 |
| Nov 27, 2000 | SYSTEM | PEACH | 592 | 5 | 8 | 2155880480 | TCPSVCS... | 2156310656 |
| Nov 27, 2000 | SYSTEM | PEACH | 592 | 5 | 8 | 2155874752 | OHTTPD.exe... | 2156310656 |
| Nov 27, 2000 | SYSTEM | PEACH | 592 | 5 | 8 | 2155858496 | httpd.exe | 2155884576 |
| Nov 27, 2000 | SYSTEM | PEACH | 592 | 5 | 8 | 2155843616 | slaved.exe | 2155884576 |
| Nov 27, 2000 | SYSTEM | PEACH | 593 | 5 | 8 | 2155884576 | SYSTEM | NT AUTHO... |
| Nov 27, 2000 | SYSTEM | PEACH | 515 | 1 | 8 | LAN Manag... | | |
| Nov 27, 2000 | SYSTEM | PEACH | 577 | 4 | 8 | NT Local S... | LsaRegist... | SYSTEM |
| Nov 27, 2000 | SYSTEM | PEACH | 592 | 5 | 8 | 2155811040 | RPCSS.EXE | 2156310656 |
| Nov 27, 2000 | SYSTEM | PEACH | 515 | 1 | 8 | KSecDD | | |
| Nov 27, 2000 | SYSTEM | PEACH | 577 | 4 | 8 | NT Local S... | LsaRegist... | SYSTEM |
| Nov 27, 2000 | SYSTEM | PEACH | 592 | 5 | 8 | 2155775392 | vmnetbridg... | 2156310656 |
| Nov 27, 2000 | SYSTEM | PEACH | 592 | 5 | 8 | 2155733856 | VMNetDHC... | 2156310656 |
| Nov 27, 2000 | shlomo | PEACH | 528 | 2 | 8 | shlomo | PEACH | (0x0|0x274B) |
| Nov 27, 2000 | shlomo | PEACH | 576 | 4 | 8 | shlomo | PEACH | (0x0|0x274B) |
| Nov 27, 2000 | SYSTEM | PEACH | 592 | 5 | 8 | 2155700256 | XYNTServic... | 2156310656 |
| Nov 27, 2000 | SYSTEM | PEACH | 592 | 5 | 8 | 2155686144 | PSTORES... | 2156310656 |
| Nov 27, 2000 | shlomo | PEACH | 592 | 5 | 8 | 2155677568 | Bam.exe | 2155700256 |
| Nov 27, 2000 | SYSTEM | PEACH | 592 | 5 | 8 | 2155663392 | mstask.exe | 2156310656 |
| Nov 27, 2000 | shlomo | PEACH | 592 | 5 | 8 | 2155658144 | BamNT_S... | 2155700256 |
| Nov 27, 2000 | SYSTEM | PEACH | 515 | 1 | 8 | Protected S... | | |
| Nov 27, 2000 | SYSTEM | PEACH | 577 | 4 | 8 | NT Local S... | LsaRegist... | SYSTEM |
| Nov 27, 2000 | christy | PEACH | 592 | 5 | 8 | 2155477920 | EXPLORE... | 2155521280 |
| Nov 27, 2000 | christy | PEACH | 592 | 5 | 8 | 2155474976 | setup.exe | 2155521280 |
| Nov 27, 2000 | christy | PEACH | 593 | 5 | 8 | 2155521280 | christy | PEACH |

FIG.2

SYSTEM AND METHODS FOR ADAPTIVE MODEL GENERATION FOR DETECTING INTRUSION IN COMPUTER SYSTEMS

CLAIM FOR PRIORITY TO RELATED APPLICATIONS

This application is a continuation of U.S. patent application Ser. No. 11/805,946 filed May 25, 2007, which is a continuation of U.S. patent application Ser. No. 10/352,342 filed Jan. 27, 2003 that issued as U.S. Pat. No. 7,225,343, which claims the benefit of U.S. Provisional Patent Application Ser. No. 60/351,913, filed on Jan. 25, 2002, entitled "Data Warehouse Architecture for Adaptive Model Generation Capability in Systems for Detecting Intrusion in Computer Systems," all of which are hereby incorporated by reference in their entireties herein.

STATEMENT OF GOVERNMENT RIGHT

The present invention was made in part with support from United States Defense Advanced Research Projects Agency (DARPA), grant nos. FAS-526617, SRTSC-CU019-7950-1, and F30602-00-1-0603. Accordingly, the United States Government may have certain rights to this invention.

COMPUTER PROGRAM LISTING

A computer program listing is submitted in duplicate on CD. Each CD contains a routines described in the Appendix, which CD was created on Jan. 24, 2003, and which is 406 kB in size. The files on this CD are incorporated by reference in their entirety herein.

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

1. Field of the Invention

This invention relates to systems and methods for detecting anomalies in a computer system, and more particularly to an architecture and data format for using a central data warehouse and heterogeneous data sources.

2. Background

As sensitive information is increasingly being stored and manipulated on networked systems, the security of these networks and systems has become an extremely important issue. Intrusion detection systems (IDSs) are an integral part of any complete security package of a modern, well managed network system. An IDS detects intrusions by monitoring a network or system and analyzing an audit stream collected from the network or system to look for clues of malicious behavior.

Many widely used and commercially available IDSs are signature-based systems. As is known in the art, a signature-based system matches features observed from the audit stream to a set of signatures hand crafted by experts and stored in a signature database. Signature-based methods have some inherent limitations. For example, a signature-based method is designed to only detect attacks for which it contains a signature in the database. Therefore, the signature-based methods cannot detect unknown attacks since there is no signature in the database for them. Such unknown attacks can be dangerous because the system is completely vulnerable to them. In addition to the expense in time and human expertise of manually encoding a signature for each and every known attack Data mining-based methods are another paradigm for building intrusion detection systems. The main advantage of these methods is that they leverage the generalization ability of data mining methods and in order to detect new and unknown attacks. Data mining IDSs collect data from sensors which monitor some aspect of a system. Sensors may monitor network activity, system calls used by user processes, or file system access. They extract predictive features from the raw data stream being monitored to produce formatted data that can be used for detection. Machine learning and data mining algorithms are used on a large set of such data (e.g., "training data") to build detection models. New data (e.g., "sensor data") gathered by sensors is evaluated by a detector using the detection model. This model determines whether or not the sensor data is intrusive. These models have been proven to be very effective. (See, W. Lee, S. J. Stolfo, and K. Mok, "Data Mining in Work Flow Environments: Experiences in Intrusion Detection," *Proceedings of the* 1999 *Conference on Knowledge Discovery and Data Mining* (KDD-99), 1999; and Christina Warrender, Stephanie Forrest, and Barak Pearlmutter, "Detecting Intrusions Using System Calls: Alternative Data Models," *Proceedings of the* 1999 *IEEE Symposium on Security and Privacy*, pages 133-145. IEEE Computer Society, 1999).

These algorithms are generally classified as either misuse detection or anomaly detection. Misuse detection algorithms model known attack behavior. They compare sensor data to attack patterns learned from the training data. If the sensor data matches the pattern of some known attack data, the observed data is considered intrusive. Misuse models are typically obtained by training on a large set of data in which the attacks have been manually labeled (See, W. Lee, S. J. Stolfo, and K. Mok. Data mining in work flow environments: Experiences in intrusion detection. In *Proceedings of the* 1999 *Conference on Knowledge Discovery and Data Mining* (KDD-99), 1999.) This data is very expensive to produce because each piece of data must be labeled as either normal or some particular attack.

Anomaly detection algorithms learn a model of normal activity by training on a set of normal data. Anomaly detection models compare sensor data to normal patterns learned from the training data. Anomaly detection algorithms then classify as an attack activity that diverges from this normal pattern based on the assumption that attacks have much different patterns than do normal activity. In this way new unknown attacks can be detected. (See, e.g., D. E. Denning, "An Intrusion Detection Model," *IEEE Transactions on Software Engineering*, SE-13:222-232, 1987; T. Lane and C. E. Brodley, "Sequence Matching and Learning in Anomaly Detection for Computer Security," *Proceedings of the AAAI-97 Workshop on AI Approaches to Fraud Detection and Risk Management*, pages 43-19. Menlo Park, Calif.: AAAI Press, 1997; Christina Warrender, Stephanie Forrest, and Barak Pearlmutter, "Detecting Intrusions Using System Calls: Alternative Data Models," *Proceedings of the* 1999 *IEEE Symposium on Security and Privacy*, pages 133-145. IEEE Computer Society, 1999; and T. Lane and C. E. Brodley, "Temporal Sequence Learning and Data Reduction for Anomaly Detection," *Proceedings of the Fifth ACM Conference on Computer and Communications Security*, pages 150-

158, 1998.) Anomaly detection models are popular because they are seen as a possible approach to detecting unknown or new attacks. Most of these algorithms require that the data used for training is purely normal and does not contain any attacks. This data can be very expensive because the process of manually cleaning the data is quite time consuming. Also, some algorithms require a very large amount of normal data which increases the cost.

As discussed above, data mining-based IDSs have their own disadvantages. Data to train the models is costly to generate. The data must be collected from a raw audit stream and translated into a form suitable for training. In addition, for misuse detection, each instance of data must be labeled either normal or attack. In the case of anomaly detection, each instance of data must be verified to be normal network activity.

Since data-mining based IDSs in general do not perform well when trained in one environment and deployed in another, this process of preparing the data must be repeated at every deployment of data mining-based IDS system. Furthermore, for each type of audit data that is to be examined (network packets, host event logs, process traces, etc.) the process of preparing the data needs to be repeated as well. Because of the large volumes of data that needs to be prepared, the deployment of a data mining-based IDS system involves a tremendous amount of manual effort.

Many of parts of these manual proms can be automated, including the collection and aggregation of the data and translating it into a form appropriate for training the data mining-based detection models. In addition, many of these processes are the same across types of audit data. Some of the processes still require some manual intervention such as labeling the data, but even these can be semi-automated.

The work most similar to adaptive model generation is a technique developed at SRI in the Emerald system. (See, e.g., H. S. Javitz and A. Valdes, "The NIDES Statistical Component: Description and Justification," *Technical Report, SRI International*, 1993.) Emerald uses historical records to build normal detection models and compares distributions of new instances to historical distributions. Discrepancies between the distributions signify an intrusion. One problem with this approach is that intrusions present in the historical distributions may cause the system to not detect similar intrusions in unseen data.

Related to automatic model generation is adaptive intrusion detection, Teng et al. perform adaptive real time anomaly detection by using inductively generated sequential patterns. (See, H. S. Teng, K. Chen and S. C. Lu, "Adaptive Real-Time Anomaly Detection Using Inductively Generated Sequential Patterns," *Proceedings of the IEEE Symposium on Research in Security and Privacy*, pages 278-284, Oakland, Calif., May 1990.) Also relevant is Sobirey's work on adaptive intrusion detection using an expert system to collect data from audit sources. (See, M. Sobirey, B. Richter and M. Honig, "The Intrusion Detection System Aid, Architecture and Experiences In Automated Audit Analysis," *Proc. of the IFIP TC6/TC11 International Conference on Communications and Multimedia Security*, pages 278-290, Essen, Germany, 1996.)

Many different approaches to building anomaly detection models have been proposed. A survey and comparison of anomaly detection techniques is given in Christina Warrender, Stephanie Forrest and Barak Pearlmutter, "Detecting Intrusions Using System Calls: Alternative Data Models," *Proceedings of the* 1999 *IEEE Symposium on Security and Privacy*, pp. 133-145, *IEEE Computer Society*, 1999. Stephanie Forrest presents an approach for modeling normal sequences using look ahead pairs (See, Stephanie Forrest, S. A. Hofineyr, A. Somayaji, and T. A. Longstaf, "A Sense of Self For UNIX Processes," *Proceedings of the* 1996 *IEEE Symposium on Security and Privacy*, pp. 120-128, IEEE Computer Society, 1996) and contiguous sequences (See, S. A. Hofineyr, Stephanie Forrest, and A. Somayaji, "Intrusion Detection Using Sequences of System Calls," *Journal of Computer Security*, 6:151-180, 1998). Helman and Bhangoo present a statistical method to determine sequences which occur more frequently in intrusion data as opposed to normal data. (See, P. Helman and J. Bhangoo, "A Statistically Base System for Prioritizing Information Exploration Under Uncertainty," *IEEE Transactions on Systems, Man and Cybernetics. Part A: Systems and Humans*, 27:449-466, 1997.) Lee et al. uses a prediction model trained by a decision tree applied over the normal data. (See, W. Lee and S. J. Stolfo, "Data Mining Approaches For Intrusion Detection," *Proceedings of the Seventh USENIX Security Symposium*, 1998; and W. Lee, S. J. Stolfo, and P. K. Chan, "Learning Patterns From UNIX Processes Execution Traces For Intrusion Detection," *Proceedings of the AAAI-97 Workshop on AI Approaches to Fraud Detection and Risk Management*, pages 50-56. Menlo Park, Calif.: AAAI Press, 1997.) Ghosh and Schwartzbard use neural networks to model normal data. (See, Anup Ghosh and Aaron Schwartzbard, "A Study in Using Neural Networks for Anomaly and Misuse Detection," *Proceedings of the Eighth USENIX Security Symposium*, 1999.) Lane and Brodley examine unlabeled data for anomaly detection by looking at user profiles and comparing the activity during an intrusion to the activity under normal use. (See, e.g., T. Lane and C. E. Brodley, "Sequence Matching and Learning in Anomaly Detection for Computer Security," *Proceedings of the AAAI-97 Workshop on AI Approaches to Fraud Detection and Risk Management*, pages 43-19. Menlo Park, Calif.: AAAI Press, 1997; T. Lane and C. E. Brodley, "Temporal Sequence Learning and Data Reduction for Anomaly Detection," *Proceedings of the Fifth ACM Conference on Computer and Communications Security*, pages 150-158, 1998; and T. Lane and C. E. Brodley, "Temporal Sequence Learning and Data Reduction for Anomaly Detection," *ACM Transactions on Information and System Security*, 2:295-331, 1999.)

In intrusion data representation, related work is the IETF Intrusion Detection Exchange Format project ("Internet Engineering Task Force: Intrusion Detection Exchange Format," http://www.ietf.org/html.charters/idwg-charter.html, 2000) and the CIDF effort (S. Staniford-Chen, B. Tung and D. Schnackenberg. "The Common Intrusion Detection Framework (CIDF)", *Proceedings of the Information Survivability Workshop*, October 1998).

The challenge in automating these processes is the need to support different types of data and different types of detection models. In a typical network environment there are many different audit streams that are useful for detecting intrusions.

What is needed is an architecture to automate the processes of data collection, model generation and data analysis, and to solve many of the practical problems associated with the deployment of data mining-based IDSs.

SUMMARY OF THE INVENTION

It is an object of the invention to provide a system and method for detecting intrusions in a computer system.

It is another object of the invention to provide support for audit data received from a plurality of data sources.

It is a further object of the invention to provide a technique for performing intrusion detecting in real time and forensics off-line.

It is a still further object of the invention to provide an architecture which is extensible and scalable.

These and other objects of the invention, which will become apparent with reference to the disclosure herein, are accomplished by a system and methods for detecting intrusions in the operation of a computer system comprising a sensor configured to gather information regarding the operation of the computer system, to format the information in a data record having a predetermined format, and to transmit the data in the predetermined data format. A data warehouse is configured to receive the data record from the sensor in the predetermined data format and to store the data in a database, such as a SQL database. A detection model generator is configured to request data records from the data warehouse in the predetermined data format, to generate an intrusion detection model based on said data records, and to transmit the intrusion detection model to the data warehouse according to the predetermined data format. A detector is configured to receive a data record in the predetermined data format from the sensor and to classify the data record in real-time as one of normal operation and an attack based on said intrusion detection model. A data analysis engine is configured to request data records from the data warehouse according to the predetermined data format and to perform a data processing function on the data records.

According to a preferred embodiment, the predetermined data format is XML markup language. The data record may comprises information regarding a source of the information, as "meta-data." The detection model generator is configured to periodically generate the detection model. A detection model distributor is configured to receive the detection model from the data warehouse and to transmit the detection model to the detector. The sensor may be a network sensor. Alternatively, the sensor may be a host sensor.

According to one embodiment, the detection model is a probabilistic model. Accordingly, the detection model generator may be configured to generate a parametrization of the probabilistic model. The detector is configured to compute a probability associated with the data record. According to another embodiment, the detection model is a set of support vectors which correspond to a decision boundary in a feature space. The detection model generator may be configured to generate a set of support vectors. The detector may be configured to map a data record to the feature space and determine the location of the data record in the feature space with respect to the decision boundary.

According to one embodiment, the data analysis engine, e.g., a visualization analysis engine, may be configured to display the data in the data warehouse as selected by a request in the predetermined data format. Another data analysis engine, e.g., a data labeling tool, may be configured to label a data record as one of normal operation and an attack. According to another embodiment, the data analysis engine is further configured to append the label data to the data records in the SQL database. Yet another embodiment of the data analysis engine is a feature extractor configured to extract a feature from a single data record or a plurality data records. This data analysis engine may be configured to append the feature data to the data records in the database.

A system for detecting intrusions in the operation of a computer system is disclosed herein which comprises a plurality of sensors configured to gather information regarding the operation of the computer system, to format the information into data records having a predetermined format, and to transmit the data in the predetermined data format. A plurality of detection model generators may be configured to request data records from the data warehouse in the predetermined data format. Each detection model generator is configured to generate a respective intrusion detection model based on said data records, and to transmit the respective intrusion detection model to the data warehouse according to the predetermined data format.

The invention provides a number of advantages, including the support of heterogeneous data, a central storage of data at the data warehouse, and a common data format enables the system to combine data from different sources very easily. The distributed architecture of the adaptive model generation system allows machine learning algorithms use data from multiple sources just as easily as data from one source. This allows correlation algorithms to be integrated into the adaptive model generation framework which could potentially increase the performance of an intrusion detection system. Accordingly, multiple different types of data sources, and alert streams, can be algorithmically combined to detect a wider range of attacks, or even coordinate attacks targeting multiple sites.

In accordance with the invention, the objects described above have been met, and the need in the art for an effective intrusion detection architecture has been satisfied.

BRIEF DESCRIPTION OF THE DRAWINGS

Further objects, features, and advantages of the invention will become apparent from the following detailed description taken in conjunction with the accompanying figures showing illustrative embodiments of the invention, in which:

FIG. 2 is an exemplary user interface in accordance with the present invention.

Figure 1:
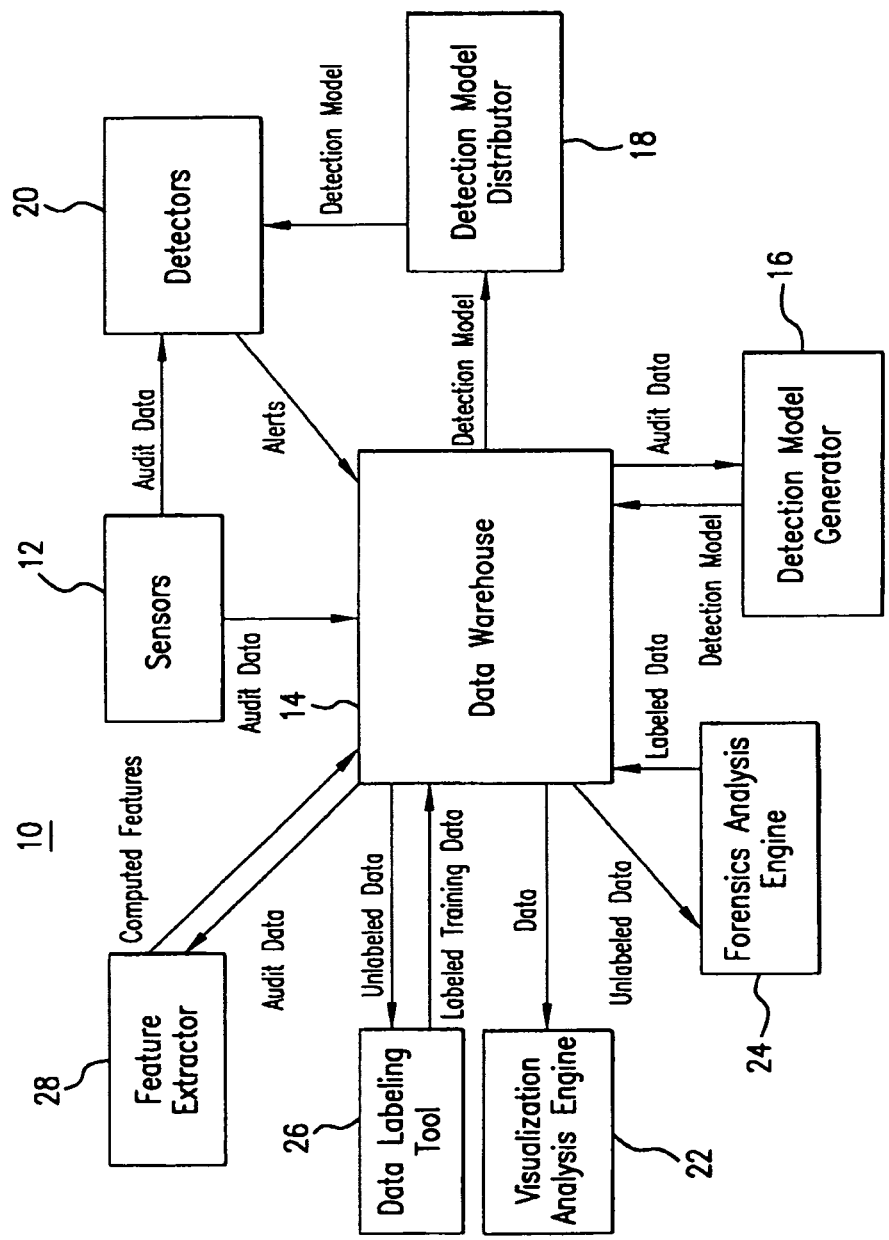
FIG. 1 is a block diagram illustrating the architecture of the system in accordance with the present invention.

Throughout the figures, the same reference numerals and characters, unless otherwise stated, are used to denote like features, elements, components, or portions of the illustrated embodiments. Moreover, while the subject invention will now be described in detail with reference to the figures, it is done so in connection with the illustrative embodiments without departing from the true scope and spirit of the invention as defined by the appended claims.

DETAILED DESCRIPTION OF EXEMPLARY EMBODIMENTS

The system in accordance with the present invention (also referred to as "Adaptive Model Generation" or AMG) is an architecture which provides and automates many of the critical processes in the deployment and operation of real time data mining-based intrusion detection systems. The system abstracts various parts of the data mining-based IDS process and formalizes the automation of this process. This includes abstracting the processes of data collection, data aggregation, detection model evaluation, detection model generation, and model distribution. The system uses a general XML-based data and model representation scheme that facilitates the translation of data from what is collected at the audit stream to the form necessary for generation of detection models.

The system architecture consists of several different types of component sub-systems. Real time components such as sensors and detectors collect information from the monitored system and detect intrusions in real time. A component of the data management capabilities of the system is a data warehouse which stores the data collected by all of the sensors in a network. Model generators access this data and train data mining-based detection models using this data. Model distributors transfer the models to the detectors. Finally analysis engines provide data analysis capabilities such as visualization and forensic analysis.

More specifically, the system has the following major capabilities: Automated data collection is provided, in which data is collected by sensors and automatically sent to detectors for classification and to the data warehouse for aggregation and use in training models. Data warehousing capabilities is provided by a data warehouse component that stores data from all sensors. This data is used for training detection models, but also may be used to support various types of data analysis such as forensic analysis. Automated model generation trains detection models from data stored in the data warehouse. The process for converting the data into the appropriate form for training is fully automated. Heterogeneous data support permits the handling of data from different types of audit sources. This capability is allowed since any form of data can be represented using a general XML-based language.

Automated model distribution is provided. Once a new model is generated, it may be deployed to all of the detectors that subscribe to the particular detection models that have been generated. The system enables evaluation of archival records stored within the data warehouse to search for intrusions. The system includes generic visualization components that allow in a consistent fashion the visualization of data from different sources. The system also provides correlation support. Since data from multiple sensors is stored in the data warehouse, the system can perform analysis over the data from multiple sources and to train detection models which examine audit streams from multiple sensors.

The system is designed to be extensible and scalable, and hence any audit source, any supervised learning module, any unsupervised (anomaly detection) learning model may be easily inserted into the architecture. In addition, any correlation function or algorithm may be easily inserted to combine information from multiple sources to provide better coverage of attacks, be they coordinated distributed attacks, or clever new attacks against multiple targets within the protected LAN. Moreover, the architecture design also allows for scalability in large networks, and high bandwidth environments. The system architecture can easily be distributed to multiple processors to increase the speed of operation, and it can utilize a high capacity data warehouse (e.g., a parallel or distributed Relational Database Management System (RDBMS)).

An exemplary embodiment of the adaptive model generation system 10 is illustrated in FIG. 1. System 10 automates the processes of data collection, data management, detection model generation and distribution, and provides various capabilities for data analysis. In a typical network environment, there are many different audit streams that are useful for detecting intrusions. For example, such data includes the packets passing over the network (e.g., header values, payload features, or combinations thereof), the system logs on the hosts in the network, and the system calls of processes on these machines. These types of data have fundamentally different properties. In addition, detection models can also vary greatly. The challenge in automating these processes is the need to support these different types of data and different types of detection models. The methods for building these detection models as well as executing them in real time vary greatly for each type of detection model.

The system 10 is a system framework and architecture that can handle virtually any data type and detection model. The system 10 consists of four types of components: (1) real time components which include sensors and detectors, (2) a data warehouse component, (2) detection model management components which include adaptive model generators and detection model distributors, and (4) data analysis components which includes components for visualization, forensics, labeling data, correlation and extracting information from multiple records.

Sensors 12 gather information from an environment and send that data to the data warehouse 14. The data in the data warehouse 14 is accessed by the detection model generators 16 which generate models that classify activity as either malicious or normal. Once a model is created, it is stored in the data warehouse 14. A model distributor 18 deploys that model to a real-time detector 20. The detector 20 receives the detection model from the detection model distributor 18 and also receives the audit data from the sensor 12. Detector 20 then uses the model to evaluate the audit data from the sensor 12 to detect intrusions.

The data analysis engines 22, 24, 26, and 28 retrieve data from the data warehouse 14. The use of the data varies depending on the particular data analysis engine. The results of an analysis are either stored in the data warehouse 14, or displayed directly to the user. Data analysis engines 22, 24, 26, and 28 allow the system 10 to implement many systems that are helpful in the deployment of an intrusion detection system. New types of data analysis engines can easily be incorporated into the system.

The system uses a distributed architecture that consists of autonomous components. By making these components independent, and linking them only with a communication protocol with very loose format restrictions, any component conforming to that protocol may interface with the system. The communication protocol uses an XML markup language which is substantially identical to the IDMEF specification in the IETF (See, "Internet Engineering Task Force. Intrusion Detection Exchange Format," as published on http://www.ietf.org/html.charters/idwg-charter.html, 2000). The system can easily be adapted to the IDMEF format or any other language format, such as, e.g., CIDF (See, S. Staniford-Chen, B. Tung, and D. Schnackenberg. "The Common Intrusion Detection Framework (CIDF)," *Proceedings of the Information Survivability Workshop*, October 1998.)

The system 10 uses two basic components to provide real time detection capabilities: sensors 12 and detectors 20. A sensor 12 is a system that collects data from an audit stream and formats the data into the appropriate form using the XML markup language. This data is then sent to a detector 20 which uses a detection model to determine whether or not the data corresponds to an attack. If the data corresponds to an attack, the detector 20 generates an alert.

In this framework, a traditional IDS system consists of a sensor 12 and a detector 20 which in most cases are integrated together. For example, in an exemplary embodiment, the Snort system contains a sensor which monitors packets and a detector which evaluates signatures over the features extracted from the packets. (Snort is described in M. Roesch, "Snort—Lightweight Intrusion Detection For Networks," *Proceedings of Lisa '99*, 1999 and in U.S. application Ser. No. 10/327,811 filed Dec. 19, 2002 claiming priority to U.S. Provisional Application 60/342,872, filed Dec. 20, 2001, entitled, "System and Methods For Detecting A Denial-of-Service Attack On A Computer System," which is incorporated by reference herein.) The system 10 separates these two components, thereby providing a means of managing the overall computation of IDS in reconfigurable architectures. For example, if the detection model evaluation for a particular audit stream is a computational bottleneck, it can be easily distributed to multiple machines.

The advantage of the system 10 over traditional system architectures is the integration of the sensors 12 and detectors 20 with other analysis and distribution sub-systems. In addition to sending the data to a detector 20, the sensor 12 also sends the data to a data warehouse 14 which aggregates and stores the data. The detector 20 retrieves its detection models from the model distributors 18. These detection models are created by other components of the system 10. Sensors 12 may be lightweight processes that gather information from a real-time audit stream, format the information into an XML representation, and then send the formatted data to the detectors 20 for real time intrusion detection and to the data warehouse 14 for aggregation of data and storage. The sensors 12 can gather information from any source. For every different audit stream of data, a sensor 12 can be implemented to monitor and collect the data.

Typically, there are two major classes of sensors 12, network sensors and host sensors. Network sensors monitor the packets moving through the network. In the exemplary embodiment, a network sensor such as HAUNT (See, Paolo De Dios, Raka El-Khalil, Kyri Sarantakos, Matthew Miller, Eleazar Eskin, Wenke Lee, and Salvatore Stolfo, "Heuristic Audit of Network Traffic: A Data Mining-Based Approach to Network Intrusion Detection," Technical report, CUCS Technical Report, 2001) is implemented, and which is used to monitor network activity. The system 10 listens to network traffic and reassembles the packets in order to create data records which summarize connections. A network sensor in the system 10 can be created from existing network IDS systems such as, e.g., Snort and Bro (See, V. Paxson, "Bro: A System for Detecting Network Intruders in Real Time, "7th Annual USENIX Security Symposium, 1998) by wrapping the component in the XML-based form required for the system. (As is known in the art, "wrapping" refers to the process of taking input and output of database, and adding meta information to. For example, wrapping is performed by adding software which receives an XML command, translates it to be understood by a MYSQL database, and also operates in the opposite direction, e.g., both input and output from the database.)

In the exemplary embodiment, there are multiple sensors 12 for each host. This configuration may be implemented because there are several different streams of information that are useful for detecting intrusions. The system has been implemented with a variety of sensors for both Windows™ and Linux systems. For a Windows™ system, there are Windows™ event log sensors, software wrappers, netatat sensors, and registry sensors. There are Windows™ event log sensors which take information from the application, security, and event logs on the Windows™ system respectively. Software wrappers are sensors that gather information about system calls. Netatat sensors use the netatat tool that gathers information about network connections on the host. data. Registry sensors monitor the activity of the windows registry when applications are run on the host.

The Linux sensors built into the system include process sensors, network connection sensors, resource sensors, and software wrappers. Process sensors use the /proc virtual filesystem to gather information about each running process. Network connection sensors collect information about network connections being made to and from the host machine. Resource sensors gather information about CPU and memory usage on a machine. The software wrappers for Linux systems are the same as for Windows™, monitoring system calls made by a process. Details of all the host based sensors can be found in Shlomo Hershkop, Frank Apap, Eli Glanz, Tania D'alberti, Eleazar Eskin, Sal Stolfo, and Johnee Lee, "Hobids: A Data Mining Approach To Host Based Intrusion Detection," Technical report, CUCS Technical Report, 2001.

The sensors 12 themselves are constructed from two major components, the basic auditing module (BAM) and the communication engine. The BAM is the component that extracts the information from the audited source. The communication engine encodes the data and sends it to the data warehouse for storage.

The BAM needs a mechanism to gather the data. This may be performed differently for streams of different types of data. Therefore, a separate BAM may be needed for each source of data that the system monitors. Packet sniffers and Win32 hooks, as known in the art, are two examples of ways to tap into the data stream and gather data. The BAM can be seen as an interface to the system being monitored. It hooks into the data stream and has the ability to transfer the information from that data stream to the communication engine. Therefore this system can function without any knowledge of how the sensor works. This makes the system very flexible with respect to sensors.

The communication engine takes the data from the BAM, encodes the data into the system XML format and then sends that data to the data warehouse 14. Along with the data itself, the BAM sends the meta data, such as variable types, to the communication engine. This is the information that the communication engine needs to encode the information. The communication engine also needs to know the type of sensor in order to send the data to the right place in the data warehouse. This is specified when the connection is made to the communication engine. An example of a record being generated from the RAD sensor, a sensor that monitors accesses to the Windows™ registry, can be seen below. The following is the raw data being read by sensor Process: IEXPLORE
Key: HKCR\Applications\notepad.exe\shell
Query: Openkey
Result: Success
Response: OxE22FC4C0

The sensor 12 sends the following Data sent to Communication Engine:

Process: IMPLORE
Key: HKCR\Applications\notepad.exe\shell
Query: Openkey
Result: Success
Response: OxE22FC4C0
Time: Tue Jul 31 14:43:20 EDT 2001
ProcQuery: 1263.4353
KeyProc: 6784.9363
QueryKey: 6621.3521
KeyResponse: 4510.2431
KeyResVal: 8743.3245

In the exemplary embodiment, the combination features are stored as hashes, not the actual values. This is done for efficiency and convenience purposes and implemented in the sensor. The communication engine then encodes the record as the following.

<rec> <process> IEXPLORE </process> <key> HKCR\Applications\notepad.exe\shell </key> <query> Openkey </query>
<result> Success </result> <response> OxE22FC4C0 </response>
<procQuery> 1263.4353 </procQuery> <keyProc> 6784.9363 <keyProc>
<queryKey> 6621.3521 </queryKey> <keyResponse> 4510.2431 </keyResponse>
<keyResVal> 8743.3245 </keyResVal>

Detectors 20 analyze audit stream data collected from a sensor and detect intrusions by using a detection model. A detector 20 performs model evaluation over each record from the sensor. The way a specific detector works depends on the type of model being evaluated. Each different model type may have a different detector that implements model evaluation for that model type.

The detector 20 may be viewed as a function that takes as input a data record and outputs an alert if the data is determined to correspond to an intrusion. An example of a detection model type is a signature-based model, which is the algorithm most widely used in commercial intrusion detection systems. A signature-based detection model simply contains a set of "signatures" which correspond to known attack types. Model evaluation consists of matching each signature in the model to a data record. If any of the signatures match, the detector generates an alert.

In the exemplary embodiment, more sophisticated model types can be used as well, including data mining-based models that use decision trees, probabilistic models and support vector machines. In the case of a decision tree, the detection model would contain an encoding of a decision tree. The detector would take this model and evaluate the detection model on a record by following the relevant branches of the tree. (Further details of a decision-tree detection model are given in U.S. application Ser. No. 10/208,402 filed Jul. 30, 2002, entitled "System and Methods For Intrusion Detection With Dynamic Window Sizes", which is incorporated by reference in its entirety herein.) In the case of a probabilistic model, the detection model would contain a parametrization of the probabilistic model and the detector would compute a probability associated with each record. (Further details of a probabilistic model are given in U.S. application Ser. No. 10/208,432, filed Jul. 30, 2002, entitled "System and Methods For Detection of New Malicious Executables," which is incorporated by reference in its entirety herein.) In the case of a support vector machine, the model would contain a set of support vectors which correspond to a decision boundary in a high dimensional feature space. The detector would effectively map a record to this high dimensional feature space and computes which side of the decision boundary the record falls on to determine whether or not to generate an alert. Further details on the support vector machine model generation and detection are provided below and in U.S. application Ser. No. 10/320,259, filed Dec. 16, 2002, entitled "Methods of Unsupervised Anomaly Detection Using a Geometric Framework," which is incorporated by reference in its entirety herein.

Detectors 20 receive detection models from model distributors 18, which distribute models stored in the data warehouse originally created by model generators. The detectors 20 receive real time updates from the model distributors 18. This process keeps the detection models updated as soon as new models are available. Below is an example of a model that the detector 20 for the RAD system (described below and in U.S. application Ser. No. 10/352,343 concurrently filed, entitled "System and Methods for Detecting Intrusions in a Computer System by Monitoring Windows Registry Accesses," uses to make a classification.

```
<model> <type> RAD <type> <target> registrydb </target> <version>
2.11 </version> <encode>
<feature> <name> process </name> <n> 52000 </n> <r> 31 </r>
<values>
iexplore.exe, aim.exe, explore.exe, msaccess.exe, pinball.exe, .
. . . . . </values>
</feature>
```

```
<feature> <name> keyval </name> <n> 52000 </n> <r> 1800 </r>
<values>
HKLM, HKLM\Applications, . . . . . . </values> </feature>
</encode> </model>
```

The encoding of this model is explained in greater detail herein. The evaluation of the record shown above with this model would result in a normal label for the record.

The data warehouse 14 is described herein. It serves as the central storage repository for all of the data collected by the sensors 12. The model generators 16 access the data in the data warehouse 14 and create detection models using this data. The data warehouse 14 also stores these detection models. The analysis engines 22, 24, 26, and 28 also access the data stored in the data warehouse 14. These components give the system visualization and forensics capabilities, as described below.

The core of the data warehouse 14 is a Structured Query Language (SQL) database. This allows for easy manipulation of the data, which allows for the creation of training data sets to build data mining-based detection models. Since arbitrary subset of data can be retrieved using an SQL query, the data warehouse automates the process of manually creating these data sets. This flexibility is very important in practical deployments of the system 10.

For example, if there are 40 Windows™ hosts in a network, in order to create an anomaly detection model over the Application Event logs for each of the hosts in the system framework, the following steps must be performed. A sensor 12 is installed on each of the hosts. This sensor collects the data and stores it in the data warehouse 14. If each host is typically used in the same way, a large data set may be created containing the combined event logs from each of the hosts. Alternatively, if each host is used differently, a separate training set may be created for each individual host. Since the data warehouse uses a SQL database, different data sets may be created by issuing different queries.

Storing the data in a single repository has several other advantages for correlating sensor outputs. For example, since the data is stored in a SQL database, "join" statements may be used to facilitate the linking of records from different sensors into single records. In addition, data may be obtained from two sensors relatively easily because all of the data is stored in the same database.

The data warehouse 14 uses an XML markup language for communication with all of the modules. The communication is specified in a specific XML markup language defined for this purpose. This markup language was influenced by the IDMEF specification, and is described in greater detail in the Appendix. The format for an insert transaction is displayed below.

```
<command>
<tablename>
<begin> <rec> <vari varitype> valueA </vari> <var2 var2type> valueA
</var2> <var3 var3type> valueA </var3> . . . . . . . . . . . . <varN
varNtype> valueA </varN>
</rec>
<rec> <vari varitype> valueB </vari> <var2 var2type> valueB </var2>
<var3var3type> valueB </var3> . . . . . . . . . . . . <varN varNtype>
valueB </varN> </rec>
<end>
```

The transaction begins with a <command> to direct the data warehouse operation appropriately. The name of the table to be operated upon is then provided via <tablename>, where the pertinent information is stored. Then the information is sent in XML format. The data starts with a <begin> tag. Each record is started with a <rec> tag. Within each record all of the data is sent for that record, variable by variable. The variable name is sent along with its type as the tag, and between the tag is the value for that variable. Any number of records can be sent at a given time using this protocol. This technique greatly reduces the cost in many cases when there are many records being sent to the database 14 by a sensor. When the data warehouse 14 decodes the XML format, it checks to see if each variable has a column in the table where the data is being inserted. If that column does not exist, then it is created on the fly.

Below is a sample transaction. It is a single record being inserted into the nfrl database by a HAUNT network sensor.

```
<insert>
<nfri>
<begin>
<rec> <ID i> 96 </ID> <dst-bytes i> 490 </dst-bytes> <rerror-rate f>
0.18786 </rerror-rate> <sensor-rate f> 0.09760 </sensor-rate> <src-
bytes i> 1381 </src-bytes> <src-count i> 151 </src-count> <src-serror-
rate f> 0.16265 </src-serror-rate> <label str> normal </label> <src
str> 128.59.22.66 </src> <dst str> 12.59.22.87 </dst> <ip-overlap str>
0 </ip-overlap> </rec>
<end>
```

The HAUNT sensor connects to the data warehouse 14 to transfer a record. It begins by sending an insert command to let the data warehouse know that it wants to insert data. Then it specifies the table nfri where the data is to be stored. Then it opens its first record with an opening <rec> tag. Each variable is sent in order to the data warehouse. First the ID of the transaction which is an integer is sent over and that is 96. Next, the destination numbers of bytes, dst-bytes, also an integer 490, is sent. Then each variable is sent sequentially until the entire record is sent to the data warehouse. For convenience, the types of data integer, float, and string are abbreviated with i, f, and str respectively. The exemplary coding of the data warehouse 14 is provided in routines dw.cfg, classl.java, DBAaccess.java, and wrapper threadX.java, which are appended hereto, as discussed in the Appendix.

The system 10 manages the creation and distribution of detection models. The detection models are generated by the detection model generators 16 using data collected stored in the data warehouse 14. They are distributed to the detectors 20 by the model distributors 18, as described herein.

The system 10 is designed to work with any model generation algorithm. Thus, the model generator components 16 can be viewed as modular components that are "plugged" into the architecture. These components take the training set of data as input and output a model of malicious activity. Different types of model building algorithms require different types of data. In the architecture of system 10, the model generators 16 may select any data through the use of general or specific queries. Accordingly, the architecture is robust enough to handle any type of model generation algorithm.

The model generation modules 16 request the data from the data warehouse 14 when they want to create a model. They form their request based on the information that the model needs to train on. The generator 16 then runs and creates a model. This model is then encoded into XML and sent to the data warehouse 14. Model generators 16 also signal the model distributor 18 to let it know that a new model is available. A sample XML encoding of a model generated by the RAD system is shown below.

```
<model> <type> RAD <type> <target> registrydb </target> <version>
2.11 </version> <encode>
<feature> <name> process </name> <n> 52000 </n> <r> 31 </r>
<values>
iexplore.exe, aim.exe, explore.exe, msaccess.exe, pinball.exe, . . . .
. </values>
</feature>
<feature> <name> keyval </name> <n> 52000 </n> <r> 1800 </r>
<values>
HKLM, HKLM\Applications, . . . . . . </values> </feature> . . . .
</encode> </model>
```

The model encoding begins with some meta-data about the model itself. The type field is used to notify the detector how to decode the rest of the model. The target specifies which table in the database this model applies to. The version information is used to coordinate with the model distributor in order to ensure that detectors have the most recent detection model. The model specifies information for evaluating the model which follows the version information. The exemplary algorithm requires information and statistics about each feature in the data, and the values observed for that feature. This information is sent over one feature at a time. The encoding is specific to the type of model. All of the data between the <encode> and </encode> is specific to the model type, and needs to be defined for each new detection model generation algorithm. This flexibility is what allows the adaptive model generation system to work with any types of models.

Many model generation algorithms can be used in real-time environments. This creates the need for model distribution ensuring that all detectors have the most recent models. In the exemplary embodiment, detectors 20 may not continuously check for updates in the data warehouse 14, because this may be inefficient, and the real-time requirements of the system 10 as a whole depend on the detectors 20 being lightweight components. The model distributors 18 are used to automatically send model updates to the detectors 20 whenever the model generators 16 create them. The exemplary coding of the detection model distributor 18 is provided in routines constants.java, DWclient.java, and MDcommunicator.java, which are appended hereto, as discussed in the Appendix.

An analysis engine is any component that takes as its input a set of data from the database 14 and performs analysis over this data. The analysis engines have the capability of inserting the results of the analysis into the database. In the exemplary embodiment, the analysis engines 22, 24, 26 and 28 query the data warehouse 14 for a set of data, and then insert new information into the data warehouse 14 using the SQL interface. This can be useful for several purposes. For example, the data analysis engines use the same XML format that the rest of the system uses, with some specific tags designed specifically for data analysis. In the exemplary embodiment, four types of analysis engines have been implemented: a visualization client 22, a forensics tool 24, a data labeling tool 26, and a feature extractor 28.

The visualization analysis engine 22 provides a system administrator with a mechanism to view all of the data in the data warehouse 14. An example of a user interface 50 provided by visualization agent implemented by the adaptive model generation system is displayed in FIG. 2, which indicates the date 52, user 54, computer 56, the operating system action which is being logged 58 (e.g., 592 a new process has been created; 528 successful logon; or 529 logon failure, unknown user name or bad password), category 60 (a code indicative of 'success' or 'failure'), type 62, and strings of data 64, 66, and 68. Action 58, category 60 and type 62 are defined by the Microsoft™ logger which writes to the registry.

Figure 3:
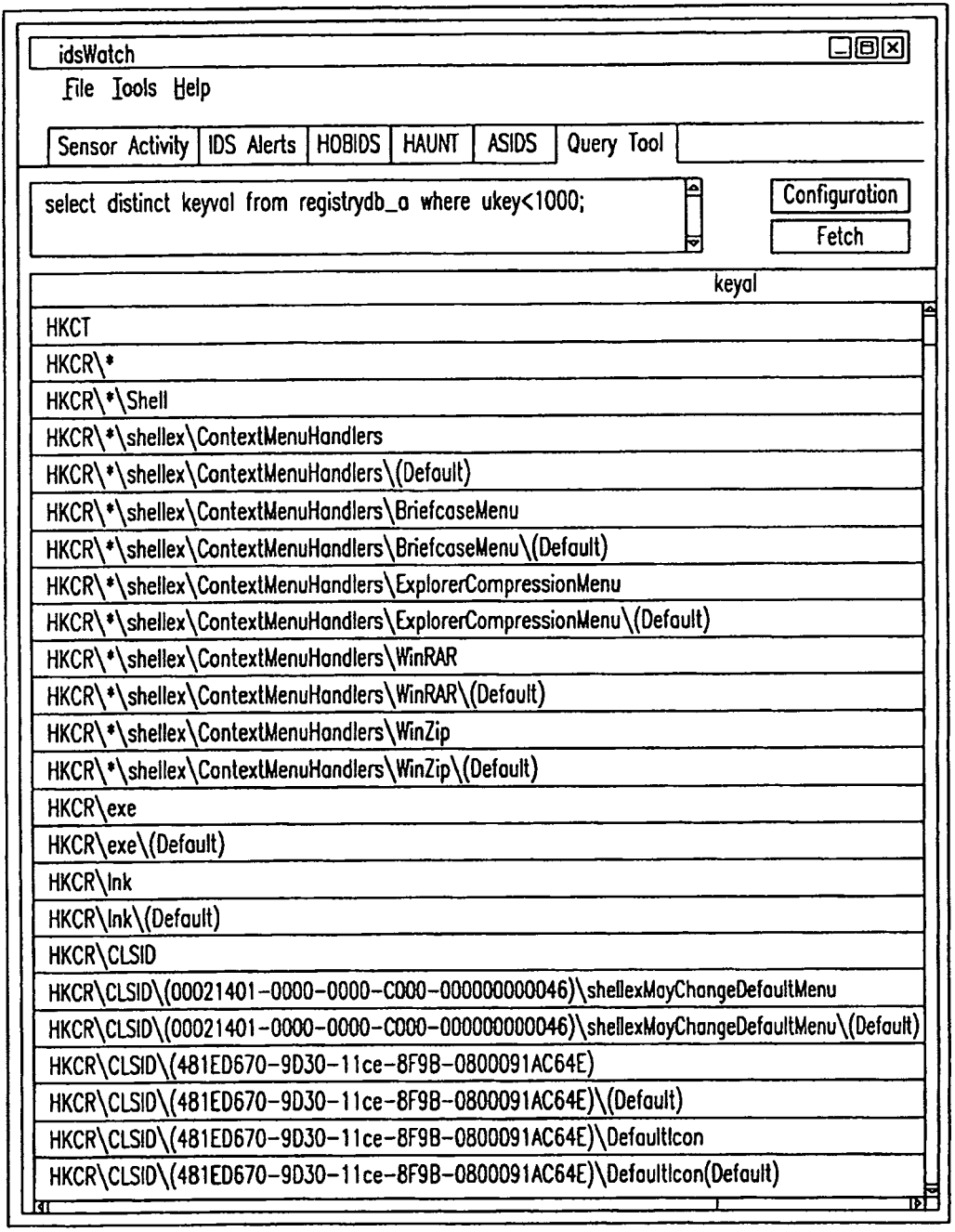
FIG. 3 is another exemplary user interface in accordance with the present invention.

The visualization analysis engine 22 is integrated with the database 14 which allows the use of SQL queries to filter the data to be viewed. An example of this interface and a SQL query is shown in FIG. 3, which illustrates an interface to the underlying database and asks how many different values of 'keys' accessing the registry during the first 1000 records.

The visualization tool can also provide an administrator or researcher with information about the strengths and weaknesses of a particular intrusion detection system. If an administrator recognizes activity as an attack but the system does not, she can act and the system can be protected even though the system missed the attack. In addition, by seeing the activity during an intrusion, this can provide insight into the vulnerabilities of the host as well, and better explain how attacks work. This will help to more accurate detection models in the future and provide security experts with the knowledge they need to improve security systems.

For example, efficient sensor networks for detecting tasks may be designed. The correlation and visualization capability might find, for example, that certain types of attacks are best detected by one source of data (e.g., a host-based detector) while another set of attacks are best detected by another (e.g., a network based sensor/detector). Hence, this architecture also provides the means of analyzing the overall detection task to architect a detection system combining components (sensors/detectors) in a manner that is both efficient and effective.

Another type of data analysis is forensic analysis. A forensic system 24 retrieves a set of historical data from the data warehouse 14. Typically, the data of interest is a set of data which is suspected to contain intrusions. The tool must retrieve a specific set of data appropriate to the algorithm in question. Once the data set is retrieved, the forensics analysis engine 24 may apply a detection algorithm to find suspicious activity in the data set. The suspicious activity is then labeled (either anomalous or normal) using SQL statements to mark the appropriate data. Note that this requires that a column be added to the table in the database in order to store the label. The data warehouse 14 has the capability to do this on the fly.

A sample input and output of a forensics analysis tool being used on RAD data can be seen below. Input data from the data warehouse:

```
<rec> <ID i> 96 </ID> <dst-bytes i> 490 </dst-bytes> <rerror-rate f>
0.18786 </rerror-rate> <sensor-rate f> 0.09760 </sensor-rate> <src-
bytes i> 1381 </src-bytes> <src-count i> 151 </src-count> <src-serror-
rate f> 0.16265 </src-serror-rate> <src str> 128.59.22.66 </src> <dst
str> 12.59.22.87 </dst> <ip-overlap str> 0 </ip-overlap> </rec>
<rec><ID i> 99 </ID> <dst-bytes i> 420 </dst-bytes> <rerror-rate f>
0.12786 </rerror-rate> <sensor-rate f> 0.16760 </sensor-rate> <src-
bytes i> 1281 </src-bytes> <src-count i> 132 </src-count> <src-serror-
rate f> 0.19325</src-serror-rate> <arc str> 128.59.22.69 </src> <dst
str> 12.59.22.121 </dst> <ip-overlap str> 0 </ip-overlap> </rec>
.. . . . . . . . . . . . . .
```

The output sent back to the data warehouse 14 contains the same data with a label appended to the end. In this example, the first record was labeled as an attack and the second record was labeled as normal.

```
<rec> <ID i> 96 </ID> <dst-bytes i> 490 </dst-bytes> <rerror-rate f>
0.18786 </rerror-rate> <sensor-rate f> 0.09760 </sensor-rate> <src-
bytes i> 1381 </src-bytes> <src-count i> 151 </src-count> <src-serror-
rate f> 0.16265 </src-serror-rate> <arc str> 128.59.22.66 </src> <dst
str> 12.59.22.87 </dst> <ip-overlap str> 0 </ip-overlap> <label str>
attack </label> </rec>
<rec> <ID i> 99 </ID> <dst-bytes i> 420 </dst-bytes> <rerror-rate f>
0.12786 </rerror-rate> <sensor-rate f> 0.16760 </sensor-rate> <src-
bytes i> 1281 </src-bytes> <src-count i> 132 </src-count> <src-serror-
rate f> 0.19325 </src-serror-rate> <arc str> 128.59.22.69 </src> <dst
str> 12.59.22.121 </dst> <ip-overlap str> 0 </ip-overlap> <label str>
normal </label> </rec>
. . . . . . . . . .
```

Forensics can be done with misuse detection models if there is a learned detection model for that data. If a learned detection model exists, it can be run over the data to find the intrusions in the data after the data has already been collected. The method can be applied with signature-based models which are used by commercial systems today. We can also use anomaly detection models if there exists a normal model for the data set. In some cases, there is no appropriate model to perform forensics. In these cases, an unsupervised anomaly detection algorithm may be used over the data. Unsupervised anomaly detection algorithms can be used to perform forensic analysis on unlabeled data. The adaptive model generation framework enables this process. Unsupervised anomaly detection algorithms detect intrusions buried within an unlabeled data set. Unsupervised anomaly detection algorithms are described in greater detail below.

Another data analysis engine is the data labeling tool 26. The data labeling tool 26 takes the list of known attacks and uses that information to label all of the records in the database 14 which corresponds to these attacks. The labeling tool 26 is used to create labeled training data. The list of known attacks could be, e.g., process names, time stamps, or anything else that is also contained in the data records and can be matched to the known attacks. The labeling tool 26 is a significant improvement over the difficult manual labeling of records in a database. The manual labeling of data is a significant cost for deploying a data mining-based intrusion detection system. This cost is cut significantly through the use of this data labeling tool 26.

The data labeling tool 26 is implemented using SQL joins with the sensor data in the data warehouse 14 and the attack list. For example, given a table full of Windows™ host-based information from the application log, all actions in the application log are stored in the data warehouse 14 with all available information from the log, including process name. Given an attack list of all process names corresponding to attacks, the labeling tool 26 can automatically insert that attack list into the data warehouse 14 in a temporary table. This temporary table could then be joined with the table of sensor data, and the resulting table would be the sensor data labeled with its attack classification. This is a labeled set of training data that was created automatically from an attack list and a large set of sensor data. Labeling collected data is necessary to create training data for data mining-based detection models. An example of the data labeling tool being used on the RAD data is seen below.

Input from the two tables in the data warehouse:
Raw Data:

```
<rec> <process> iexplore.exe </process> <query> queryKey </query> . . .
</rec>
<rec> <process> happy99. exe </process> </query> createKey </query>
. . .
</rec>
```

```
<rec> <process> outlook. exe </process> </query> openKey </query> ...
</rec>
.....
```

Attack List of Process Name:

```
<process> happy99.exe </process>
<process> bo2k.exe </process>
.....
```

Labeled Data:

```
<rec> <process> iexplore.exe </process> <query> queryKay </query> ...
<label> normal </label> </rec>
<rec> <process> happy99. exe </process> </query> createKey </query>
...
<label> attack </label> </rec>
<rec> <process> outlook.exe </process> </query> openKey </query> ...
<label> normal </label> </rec>
.....
```

Features are important discriminating attributes derived from raw audit data that are employed in detection models. A feature extractor 28 is any module that takes as input raw audit data and outputs additional pieces of information that were computed from the raw data. These new features are augmented to the original record. This is a more general version of the forensic analysis engine.

Many features may be computed by using information that spans several individual records. Frequently, records by themselves are not meaningful, but in combination with other records they could represent an attack. The data warehouse 14 has the capability to provide the feature extractor 28 with any subset of data necessary. This could be the past n records for use with algorithms based on sequences, or those that compute temporal statistical features of connections or sessions. The flexibility of this system allows any group of record to be used to create a feature.

Features can also be created from a single record. In this case the feature extractor needs only to retrieve a single record and perform any calculations necessary to compute the feature.

Once the feature or features have been calculated they must be appended to the data in the data warehouse 14. A column may be added to the table using the SQL interface to store the values of the new feature. An example of extracting some features gathered from the HAUNT sensor is shown below.

This example shows features extracted from three records. Features could also be extracted from any number of records. This example shows the calculation of the number of http connections seen by the sensor thus far:

```
<rec> <ID i> 99 </ID> <dst-bytes i> 420 </dst-bytes> <rerror-rate f>
0.12786 </rerror-rate> <sensor-rate f> 0.16760 </sensor-rate> <src-
bytes i> 1281 </src-bytes> <src-count i> 132 </src-count> <src-serror-
rate f> 0.19325</src-serror-rate> <src str> 128.59.22.69 </src> <dst
str> 12.59.22.121 </dst> <ip-overlap str> 0 </ip-overlap> </rec>
<rec> <ID i> 100 </ID> <dst-bytes i> 325 </dst-bytes> <rerror-rate f>
0.13426 </rerror-rate> <sensor-rate f> 0.12450 </sensor-rate> <src-
bytes i> 1341 </src-bytes> <src-count i> 242 </src-count> <src-serror-
rate f> 0.12435</src-serror-rate> <src str> 128.59.22.63 </src> <dst
str> 12.59.22.121 </dst> <ip-overlap str> 0 </ip-overlap> </rec>
<rec> <ID i> 101 </ID> <dst-bytes i> 425 </dst-bytes> <rerror-rate f>
0.12456 </rerror-rate> <sensor-rate f> 0.12654 </sensor-rate> <src-
bytes i> 1311 </src-bytes> <src-count i> 102 </src-count> <src-serror-
rate f> 0.21325 </src-serror-rate> <src str> 128.59.22.63 </src> <dst
str> 12.59.22.121 </dst> <ip-overlap str> 0 </ip-overlap> </rec>
```

The updated records contain a new feature num_http which stores the new information.

```
<rec> <ID i> 99 </ID> <dst-bytes i> 420 </dst-bytes> <rerror-rate
f>0.12786 </rerror-rate> <sensor-rate f> 0.16760 </sensor-rate> <src-
bytes i> 1281 </src-bytes> <src-count i> 132 </src-count> <src-serror-
rate f> 0.19325 </src-serror-rate> <arc str> 128.59.22.69 </arc> <dst
str> 12.59.22.121 </dst> <ip-overlap str> 0 </ip-overlap> <num_http> 1
</num_http> </rec>
<rec> <ID i> 100 </ID> <dst-bytes i> 325 </dst-bytes> <rerror-rate f>
0.13426 </rerror-rate> <sensor-rate f> 0.12450 </sensor-rate> <src-
bytes i> 1341 </src-bytes> <src-count i> 242 </src-count> <src-serror-
rate f> 0.12435 </src-serror-rate> <src str> 128.59.22.63 </src> <dst
str> 12.59.22.121 </dst> <ip-overlap str> 0 </ip-overlap> <num_http> 2
</num_http> </rec>
<rec> <ID i> 101 </ID> <dst-bytes i> 425 </dst-bytes> <rerror-rate f>
0.12456 </rerror-rate> <sensor-rate f> 0.12654 </sensor-rate> <src-
bytes i> 1311 </src-bytes> <src-count i> 102 </src-count> <src-serror-
rate f> 0.21325 </src-serror-rate> <src str> 128.59.22.63 </src> <dst
str> 12.59.22.121 </dst> <ip-overlap str> 0 </ip-overlap> <num_http> 3
</num_http> </rec>
```

Feature extractors are components that transform the basic features gathered by the sensors into more meaningful ones, often referred to as advanced features. For example the time stamp on a packet is not a very important feature when considered alone. However, using the time stamp to compute the number of packets within the last two seconds can be a crucial piece of information in determining certain types of network attacks. Models learned over well-computed features are generally far superior to those computed over raw pieces of information.

Feature extractors 28 can be seen as data analysis engines by the system. They retrieve data from the data warehouse 14 and then perform computations on that data. Once these computations are completed the new data is sent back to the warehouse 14 and appended with the new information.

In many cases the feature extractors are built into the sensors. This makes the number of components smaller and easier to manage. However, this configuration requires that a specialized feature extractor must be made for each sensor. Another concern with combining the feature extraction with the sensor is that many feature extraction algorithms can be very computationally expensive. The sensor is the only component that must be run on the system it is protecting. It is therefore crucial that the sensor is very lightweight. Separate feature extraction modules can be extremely helpful in keeping the sensors lightweight.

Another important consideration when designing an intrusion detection system is efficiency. A real-time system must be able to respond to intrusions in a timely manner so that action can be taken, without utilizing too many of the resources of the system it is intended to protect. This is especially important in the case of host-based systems. The adaptive model generation framework emphasizes light components and a distributed architecture. Resource-heavy components can be separate from the system that the IDS is trying to protect. The only component that needs to be run on the system being protected is the lightweight sensor. This greatly minimizes the amount of computational resources taken by the IDS.

An example of where this advantage is useful is in the HAUNT system which is a network intrusion detection system. The deployment of the HAUNT system in the system framework is described in greater detail below.

The system 10 described above has a distributed architecture to allow for the automation of the data collection and data warehousing. In the system framework, simply deploying a sensor will automatically collect and aggregate that sensors data in the data warehouse. This is desirable in order to aggregate the data. For example, the data analysis may include performing forensic analysis of archival data. It may also be useful to look back at errors made by the intrusion detection system in order to improve performance and study weaknesses.

The distributed architecture of system 10 allows the system to gather data from heterogeneous systems. A set of standard guidelines in a flexible format are placed on sensor data, as described in the Appendix. There are many different types of information that IDSs use, such as e.g., network packets, application logs, Windows™ registry accesses, etc. The ability to accommodate these different sources of information in a consistent way is a large advantage of the adaptive model generation system.

This is easily accomplished in system 10 because all of the data gathered by the system is transmitted to the data warehouse 14 using the XML mark up language. The system is flexible enough to store all types of information.

In a typical network environment, the system permits the deployment of many models throughout the network. These models can also become out of data. Accordingly, the system has a mechanism for the creation and the management of detection models. The models are created using the detection model generators 16, described above. The detection models are then stored in the data warehouse 14. The data warehouse 14 is robust enough to handle any types of models, and therefore the system can be used with any types of models. The data warehouse 14 is also stable enough that failure of model storage is not a concern while the protected machine is under attack. The use of model distributor 18 allows the system 10 to update and alter models on the fly with a minimal computational overhead. This is very advantageous because it allows the system 10 to be deployed for a long period of time without the need for maintenance by an administrator.

The flexibility of XML is used here for the management functions. All data (models, sources, etc.) are described easily in the XML framework by "meta-data" that describes the source and its relationship to other sources and components. This framework is used to provide management functionality. This coupled with a visualization tool, e.g. visualization analysis engine 22, greatly aids the analysis of data.

Distributed models are models that are trained and evaluated over multiple sets of data from multiple sources. Traditional intrusion detection systems would have difficulty combining data from multiple different sources, especially across different networks. By eliminating dependencies between sensors, model generators, and detectors, the system has enabled correlation algorithms to be constructed the same as any other algorithm. The distributed architecture and the data warehouse allow implementation of correlation algorithms with no additional implementation overhead. The data warehouse allows for the retrieval any subset of the data in the database with a single query. This means that data from multiple sources can be retrieved just as easily as data from a single source. This data can be aggregated and used more efficiently than if it was stored individually For example, a correlation algorithm operates in the following manner: given a training set of labeled data, each of detection models is run over the data. A probability table can be created to show which detection model has a probability of being correct given the outputs of the other models. For example, an exemplary system uses ten detection models, which are looking for an attack A in a given operation or process. In this case, models 19 of the detection models may label the operation or process as an attack, but model 10 does not label the operation or process as an attack. Accordingly, it is possible to calculate the probability that model 10 is correct. As a result, when model 10 is used to predict an attack, there is a statistic to predict the degree to which the model is believed to be accurate.

There are three exemplary types of model generation algorithms that the system 10 supports. The first is misuse detection, which trains on labeled normal and attack data. The second is supervised (traditional) anomaly detection which trains on normal data. The third is unsupervised anomaly detection which trains on unlabeled data.

Misuse detection algorithms train over normal and attack data. Using this data, these algorithms build a model that can discriminate between attack records and normal records. These models can then classify new records as either attack or normal. The only major disadvantage of this type of system is that it requires labeled training data that contains labeled normal activity and labeled attacks. This data is very expensive to obtain, and it may not be portable from one system to another or from one network to another. Misuse detection algorithms can be used as model generation algorithms in the adaptive model generation framework. The training data for misuse detection algorithms must consist of labeled normal and attack data, often making the training data for this algorithm very expensive.

Using the system, the cost of labeling the data can be minimized. Once the sensors are deployed into a network, simulated attacks can be run and the time stamps and other information about the attack recorded. Since the sensors will be automatically sending the data to the data warehouse, the data for labeling is already aggregated into one location. Using the data labeling tool, the attack data can be labeled. This labeled data is now stored in the data warehouse and can be retrieved by the model generators. These models can also be distributed into the detectors using the model distributors.

Anomaly detection algorithms train over normal data to create a model of normal activity. These algorithms need to train over data that contains no intrusions. The training data needed for these algorithms is expensive because it is difficult to ensure that the data contains no intrusions. This can be done by either having an expert manually clean the data, or by somehow ensuring that the data contains no intrusions to begin with. In general this is not as expensive as the training data necessary for misuse detection algorithm. However many anomaly detection algorithms require a very large amount of training data which can increase the cost. Once an anomaly detection model is trained, it can then classify new data as normal or anomalous. These algorithms operate on the principle that attacks are behavior that is different from normal.

The adaptive model generation framework supports the creation of anomaly detection models. Since sensors send data to the data warehouse, it is easy to aggregate the data for collection. Using the forensics analysis engine, it is possible to see if the data is clean and contains no intrusions. This can greatly decrease the cost of creating the training set since it speeds the process of verifying that the data is clean. The model generators can automatically generate anomaly detection models using the data from the data warehouse and deploy the detection models using the model distributor.

Unsupervised anomaly detection algorithms examine unlabeled data and attempt to detect intrusions buried within the unlabeled data. Unsupervised anomaly detection algorithms operate under the principle that intrusions are very rare compared to the normal data and they are also quantitatively different. Because of this, intrusions are outliers in the data and can be detected.

Since unsupervised anomaly detection can detect intrusions in an unlabeled data set, they are used inside the forensics analysis engines. Data from the data warehouse is sent to a forensics analysis engine where an unsupervised anomaly detection algorithm is applied. The forensics analysis engine can label the data which it determines to be an outlier. Unsupervised anomaly detection algorithms can also be used to help label data that is collected by the system. This labeled data can then be used to train a misuse or anomaly detection model.

One specific type of model generation algorithm used by the system is Support Vector Machines (SVMs). This algorithm can be used for both Unsupervised Anomaly Detection and normal Anomaly Detection, and is described in greater detail in U.S. application No. [not yet known], filed Dec. 16, 2002, entitled "Methods of Unsupervised Anomaly Detection Using a Geometric Framework," which is incorporated by reference above. The SVM algorithm is a binary classifier. The operating principle for an SVM approach to intrusion detection is that data is mapped to a feature space. Inside this feature space, the SVM and a set of labeled training data are used to determine a linear decision surface (hyperplane). This surface is then used to classify future instances of data. Data is classified based upon which side of the decision surface it falls.

Given a training set S consisting of m vectors and their labels $(x_i, y_i)$ where $x_i \in \Re^n$ and $y_i \in \{\pm 1\}$, the algorithm generates a decision surface. The decision surface is a hyperplane of the form $\langle w,x \rangle + b = 0$ where w is normal to the hyperplane and b scalar that shifts the hyperplane. The decision surface that is chosen is determined by solving an optimization problem that determines the "best" hyperplane under a set of criteria which is known in the art (See, e.g., N. Cristianini and J. Shawe-Taylor. *An Introduction to Support Vector Machines*. Cambridge University Press, Cambridge, UK, 2000.)

The classification of a future instance $x \in \Re^n$ is made by the function $$f(x) = sgn(\langle w,x \rangle + b)$$

Solving the following optimization problem results in a solution the solution to the SVM optimization.
maximize:

$$\sum_i a_i - \frac{1}{2} \sum_{i,j} a_i a_j y_i y_j \langle x_i, x_j \rangle$$

subject to:

$$0 \leq a_i, \sum_i a_i y_i = 0$$

Setting b=0, the solution is then:

$$w = \sum_i a_i y_i x_i$$

All $x_i$ with $a_i \neq 0$ are called the support vectors. These are the vectors on the border of each class that determine the unique solution. If a support vector were removed, it would change the resulting hyperplane. However, all non-support vectors are irrelevant to the solution. They can all be removed and the solution would not change.

This algorithm performs best when the data is linearly separable data. However, in order to work for the non-linearly separable case, data must be mapped into a higher dimension feature space where it does become linearly separable. In addition, often intrusion detection data are not all vectors in $\Re^n$ so there is no natural definition of the dot products between the data elements.

Since the SVM algorithm is defined in terms of dot products, kernel functions may be used to define both the mappings of the elements to the feature space and the dot product within these space simultaneously. This fact can be exploited and a kernel function can be used in place of the dot product.

Let $\Phi$ be a feature map $\Phi: X \to F$. $\Phi$ maps the input space X into a dot product space called the feature space F. A kernel function K implicitly maps data into this feature space and takes the dot product in that space.

$$K(x_i, x_j) = \langle \Phi(x_i), \Phi(x_j) \rangle$$

An example of a kernel function is the Gaussian kernel.

$$K(x_i, x_j) = e^{-\|x_i - x_j\|^2 / 2\sigma^2}$$

Now the support vector machine optimization equation and classification equation can be rewritten in terms of kernels.
maximize:

$$\sum_i a_i - \frac{1}{2} \sum_{i,j} a_i a_j y_i y_j K(x_i, x_j)$$

subject to:

$$0 \leq a_i,$$

$$\sum_i a_i y_i = 0$$

Substituting the formula for w into the classifier equation we get another dot product that can be converted to a kernel. Setting b=0 the solution is then:

$$f(x) = sgn\left(\sum_{i=1}^{N_3} a_i y_i K(s_i, x) + b\right)$$

where $N_3$ is the number of support vectors and $s_i$ is the $i^{th}$ support vector.

The standard support vector machine algorithm is used for misuse detection by the system. Data in the form of vectors of real numbers are sent from the sensors 12 to detectors 20. The detectors 20 use a SVM model to differentiate between normal data and intrusion data.

To implement this in the system, training data must first be generated. A system is monitored by sensors 12 that send their observations to the data warehouse 14 in the form of XML tagged data. Sporadically, different attacks are launched against the system. After enough training data has been generated, data is labeled in the data warehouse 14 as either normal or attack. This labeled data is then sent via XML to the model generator 16. The model generator 16 uses the SVM algorithm to create a model for misuse detection. A model, in this case, is the set of support vectors and their weights. This model is automatically sent to the data warehouse 14 for storage and to all of the detectors 20 that use this kind of model. Once the model is in place, sensors 12 send data that they are monitoring to the detector 20 for classification by the SVM classification rule.

The standard SVM algorithm is a supervised learning algorithm. It requires labeled training data to create its classification rule. An unsupervised variant does not require its training set to be labeled to determine a decision surface (See, e.g., B. Schölkopf, J. Platt, J. Shawe-Taylor, A. J. Smola, and R. C. Williamson. "Estimating the Support of a High-Dimensional Distribution," *Technical Report* 99-87, *Microsoft Research*, 1999.

The algorithm is similar to the standard SVM algorithm in that it uses kernel functions to perform implicit mappings and dot products. It also uses the same kind of hyperplane for the decision surface. The solution is only dependent on the support vectors as well. However, the support vectors are determined in a different way. This algorithm attempts to find a small region where most of the data lives and label it as class +1. Everywhere else is labeled as class −1. This is accomplished by finding the hyperplane that maximizes the distance from the origin while still capturing the majority of the data. The support vectors define that hyperplane.

Given a training set S consisting of m vectors $x_i \in \Re^1$ minimize:

$$\frac{1}{2} \sum_{i,j} a_i a_j K(x_i x_j)$$

subject to:

$$0 \le a_i \le \frac{1}{vl},$$

$$\sum_i a_i = 1$$

where 0<v<1 is a parameter that controls the trade off between maximizing the distance from the origin and containing most of the data in the region created by the hyperplane.

The classification equation is:

$$f(x) = \text{sgn}\left(\sum_{i=1}^{N_3} a_i K(s_i, x) - b\right)$$

where $N_3$ is the number of support vectors and $s_i$ is the $i^{th}$ support vector. For this algorithm b cannot be set to 0, it must be found explicitly.

$$b = \sum_{j=1}^{N_3} a_j K(s_j, s_i)$$

The unsupervised SVM variant proposed by Schölkopf can be used for unsupervised anomaly detection. This approach was described in U.S. application Ser. No. 10/320,259, filed Dec. 16, 2002, entitled "Methods of Unsupervised Anomaly Detection Using a Geometric Framework," incorporated by reference above, perform unsupervised anomaly detection using the system framework. The algorithm differentiates between normal data and anomalous data. Anomalous data is thought to be intrusion data because intrusions are much different than normal system use.

Like the misuse detection algorithm, unsupervised anomaly detection requires training data. During a training period, a system is run normally with no attacks. Sensors 12 monitoring the system send their observations via XML to the data warehouse 14. Although no attacks are intentionally run, if some unknown attacks were to occur, there would be no problem. The algorithm can tolerate some noise (unknown attacks) and still generalize well. Once enough training data has been accumulated it is sent from the data warehouse 14 to the model generator 16 via XML. There is no need to label data. The model generator 16 then uses the unsupervised SVM algorithm to generate a model of normal activity. This model is made up of the set of support vectors and their associated weights. The model is then sent to the data warehouse 14 for storage and to the appropriate detectors 20. Once the detection model is in place, sensors 12 send data to the detector 20 for classification.

The system framework can support a variety of different intrusion detection systems. One example of an IDS system that is integrated into the system is the Registry Anomaly Detection (RAD) system, which is described in greater detail in U.S. application No. [not yet known] concurrently filed, entitled "System and Methods for Detecting Intrusions in a Computer System by Monitoring Windows Registry Accesses," incorporated by reference above. The RAD system is a host-based IDS system which runs on the Microsoft™ Windows™ platform. RAD monitors the accesses to the Windows™ registry on a host and detects anomalous registry accesses that correspond to attacks. It uses an anomaly detection algorithm to make models of normal registry accesses and compares in real time, monitored accesses to that model.

The RAD system uses several features to characterize each registry access. Five of these are basic features that come directly from the registry accesses, and five are composite features which are made from the combination of two of the basic features. The basic features are Key, Process, Query, Response, and ResultValue. The advanced features are Process/Query, Key/Process, Query/Key, Response/Key, and ResultValue/Key. The first five features are derived directly from the registry accesses.

The registry is stored in a tree structure, and all information is stored in a data structure called a key. The name of the location where the information is stored is the Key basic feature. The Process feature is the name of the process that is performing the registry access. The Query feature represents the type of access being made, such as QueryValue, CreateKey, SetValue, etc. The Response feature is the outcome of the query, such as success, not found, access denied, etc. The Result feature is the value of the key being accessed. These five features provide all the necessary information about any single registry access.

The RAD sensor consists of two parts. The first part connects to the Windows™ operating system and monitors the accesses to the registry. This part is implemented as a basic auditing module (BAM). The BAM includes a hook into the audit stream which is the Windows™ registry. The architecture of the system is taken from the commercial software Regmon produced by SysInternals (as described in "SysInternals. Regmon for Windows NT/9x," Online publication, http://www.sysinternals.com/ntw2k/source/regmon.shtml, 2000). The BAM uses Win32 hooks to listen for all reads and writes to registry.

The second part of the RAD sensor is the communication component which translates this data into the XML format and sends it to the data warehouse 14. The communication module can support multiple BAMs at the same time. This is done so that all sensors running on a host can be sent through a single source. Then the communication engine can send the data from all these sources to the data warehouse for storage.

The five composite features that are used by the RAD system are examples of feature extraction. The RAD system uses composite features in order to better classify activity. This is an example of the feature extraction capabilities of the adaptive model generation system. This is one of the cases where the feature extractor is very lightweight and therefore a part of the sensor.

These ten features are used to classify each registry access as either normal or anomalous. In order to do this we implemented an anomaly detection algorithm as described in U.S. application No. [not yet known] concurrently filed, entitled "System and Methods for Detecting Intrusions in a Computer System by Monitoring Windows Registry Accesses."

Each feature is individually evaluated to be either normal or anomalous. Then the statistics we gathered are used to score these anomalies. This score is based on how likely it is that the value of this feature will be different than values seen in the past. These scores are then added together and if they are over a threshold then the access is considered to be malicious, otherwise it is classified as normal. Any algorithm could be used without changing the overall architecture. Also from the point of view of the classification algorithm the sensor is not important. This algorithm could have been used on any data without any changes in architecture. Accordingly, the above is provided as an exemplary embodiment of the present invention.

In order to detect anomalies in real time, a detector 20 was implemented for the RAD system. Although this detector was implemented specifically for the RAD system, it could be used to evaluate any model that was created by the classification algorithm described above. The first requirement of the detector is that it must receive data from the sensor in real time. This is necessary to evaluate models in real time. The detector must also decode the model and have the capability to receive real time updates to this model. The RAD detector would retrieve the model from the data warehouse 14, decode it, and then evaluate each record that it was sent from the sensor. This is all done in real time and consequently the system is successful in detecting malicious activity in real time.

The multiplicity of this system can easily be increased with the novel system described herein. With no changes in architecture, the system can support any number of host machines and sensors. With a conventional system architecture, increasing the multiplicity would require major changes in the structure of a system. According to the invention, the central data collection is automated in the system. This means that data from multiple machines is gathered in the same place and can be analyzed from that central location.

Another exemplary implementation of the system is the Heuristic Audit of Network Traffic (HAUNT) system, which is a network based intrusion detection system that classifies network data as either normal or attack. Previous research has shown that network packet information can be useful in detecting intrusions. The majority of commercial intrusion detection systems use network data to detect attacks. This is because many attacks are remote attacks and they can be seen in the network data. However these commercial systems are signature-based due to the high cost of deploying a data mining based network intrusion detection system.

The HAUNT sensor is designed to gather information from a network stream. It listens to all network data, formats it, and sends that data directly to the data warehouse 14. The network sensor does not use a communication engine because it does not run on a host, so there is no need to aggregate information before it is sent to the data warehouse. The HAUNT sensor is implemented by utilizing the commercial products NFR, Network Flight Recorder Inc. Network flight recorder, 1997, described at http://www.nfr.com, and Snort, described above. They use an abstract feature definition structure and a feature exchange protocol to extract information from the NFR and Snort systems. The HAUNT system only uses packet header information to extract features. This is done for efficiency purposes and because the system can be effective and inexpensive using just this information.

The HAUNT system uses a multiple model cost-sensitive approach to improve efficiency. The system is designed to minimize the computational cost of an intrusion detection system. The system first attempts to make a classification based on a simple rule and the basic data gathered from the sensor. If the system cannot confidently make a classification, the system will perform more calculations in order to make a better decision. The system accomplishes this by implementing multiple models to classify the data. The difference between the models is that some are more accurate at the price of being more computationally expensive. The system does not evaluate the more expensive models unless it has to in order to make a classification. The more expensive models are more expensive in large part due to the fact that they require more data. These expensive models require derived features from the packet information. Some of these features are very expensive to calculate and therefore they are only calculated when needed by the more expensive models.

The HAUNT system uses a special type of detector called JUDGE that implements multiple model evaluation. The JUDGE system was implemented as a part of the HAUNT system in order to accomplish the evaluation of the multiple models. The JUDGE system is the system that decides whether to calculate more expensive features and evaluate more expensive models. The JUDGE models are models generated from the RIPPER model generation program, as is known in the art. RIPPER generates rule sets for evaluation by the JUDGE system. These rule sets come in one of two different types. The first type is ordered rule sets. When evaluating ordered rule sets, JUDGE goes through each rule, one by one, until one of the rules can make a classification and then that rule makes the decision. The second type of rule set is unordered rule sets. When evaluating unordered rule sets each rule in the set is evaluated and the rule with the most precise ruling makes the ruling. The unordered rule sets are more precise because they are always labeled by most precise classifying rule. However ordered rule sets are faster because in many cases JUDGE does not have to evaluate every rule in the rule set.

The HAUNT system uses a feature extractor to discover features that are useful for detecting attacks. The algorithms for performing this feature discovery are described in [14]. The HAUNT system uses a feature descriptor in order to define the features that it uses for classification. These features are defined using arithmetic and logic expressions to combine primitive features. The logic expressions implemented by this system are SUM, AND, and UNIQUE. These features can be used to create a wide variety of important features. The SUM feature could be used to calculate the total number of times something has happened. For example, to calculate the total number of tcp connections, the following command could be used:

num_tcp_connections=SUM(protocol==tcp)

The SUM(protocol==tcp) returns the total of number of records of which the condition service==http is true. To calculate the total number of tcp connections going to port 2301, the following command is used:

num_tcp_connections_to_port_2301=SUM
   ((protocol==tcp) AND destination_port==2301))

The AND operator is used to take the AND of two conditional expressions the same way it is normal used. The final logical operator is the UNIQUE operator. The UNIQUE operations takes in two parameters, a conditional, and a feature. The operator will return the number of unique values that feature has had when the condition is true.

For example, to get the number of different ports accessed by tcp protocol, the following command could be used:

num_tcp_ports=UNIQUE(protocol==tcp, destination_port)

These logical functions along with arithmetic functions such as multiplication and addition are all the HAUNT system needs to define all of the features it uses. The feature extraction provided by these tools can be seen as a data analysis engine by the system. Feature extraction is an important part of many intrusion detection systems. The HAUNT system is an example of the feature extraction capabilities of the adaptive model generation system can be extremely useful in enabling an intrusion detection system.

It will be understood that the foregoing is only illustrative of the principles of the invention, and that various modifications can be made by those skilled in the art without departing from the scope and spirit of the invention.

APPENDIX

The software listed herein is provided in an attached CD-Rom. The contents of the CD-Rom are incorporated by reference in their entirety herein.

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

Data Warehouse communication protocol.
How to run the server: If the server is not running:
   java Class1
How to connect to the server:
   telnet hostname 3000
NOTE: hostname is the name of the machine the DW is installed on and 3000 is the port that the server is listening on. You will get the following:

Trying IP address . . .
Connected to hostname.
Escape character is '^]'.
WrapperThread running version: . . . Ver 2.00 Enter: password id
Next type:
   password table_name
where table_name can be any name from the dw.cfg file. Next you get the input prompt where you can type commands:
   type input>

The following commands are used to insert and obtain data form the database in the datawarehouse:

INSERT: This command is used to insert a table into the database specified by ID. The ID must be a valid table in the dw.cfg file. The records to be entered follow a specific tag convention, described below. Insert commands use the following format:
   insert\n id\n<begin>\n tagged data <end>\n If the insertion is successful it returns "DBAccess: insert1: Successful insertion." If there is a problem it returns "DBAccess: insert1:"+the exception. The tags <begin> and <end> are case sensitive and cannot have white space. If a column name is not recognized, a new column will be created. If a record has an invalid endtag, it is dropped. If a column tag is empty or is not specified, a NULL will be inserted for that column. Records are inserted as they are received, on the fly.

Example

This example inserts two records into registrydb. All the columns not specified will contain NULL:

```
insert\n registrydb\n <begin>\n
   <rec><hostname str>Name1</hostname><query hs>Long Query1</query><queryCode u>27654</queryCode>
   <rec><hostname str>Name2</hostname><query hs>Long Query2</query><queryCode u>98456</queryCode>
   <end>\n
```

QUICKINSERT: This command works in substantially the same manner as the insert command. It uses the same syntax and tag convention. It was created as a faster method of inserting records. Accordingly, it should be used instead of insert in most cases. Quickinsert commands have the following format:
   quickinsert\n id\n<begin>\n tagged data <end>\n If the insertion is successful, it returns "DBAccess: insert1: Successful insertion." If there is a problem, it returns "DBAccess: insert1:"+the exception. One difference from insert is that the records are not sent to the database until <end> is read. The tags <begin> and <end> are case sensitive and cannot have whitespace. If a column name is not recognized, a new column will be created. If a record has an invalid endtag, it is dropped. If a column tag is empty or is not specified, a NULL will be inserted for that column.

Example quickinsert uses the same syntax as insert. Accordingly, the same example is valid. This example inserts two records into registrydb. All the columns not specified will contain NULL.

```
quickinsert\n registrydb\n <begin>\n
   <rec><hostname str>Name1</hostname><query hs>Long Query1</query><queryCode u>27654</queryCode>
```

```
<rec><hostname str>Name2</hostname><query hs>Long
Query2</query><queryCode u>98456</queryCode>
    <end>\n
```

INSERTXML: This command takes records in XML format and inserts them in the table specified by ID. An insertxml command has the following format:

insertxml\n id\n<begin>\n xml_tagged_data <end>\n

If successful, it returns "Successful Insert"+time in ms. If there is an error, it returns: "Error in insertXML"+error. This is faster than either insert or quickinsert. XML tags are not case sensitive and can have ignorable white space. Records are not sent to the database until <end> is read. All records are assumed to be in the same order and same form in the same batch. If a column tag is empty or is not specified a NULL will be inserted for that column. The tags for insert are slightly different then the tags that are returned with getxml, described below.

Example

This example from earlier inserts two records into registrydb.

```
insertxml\n registrydb\n <begin>\n
    <Table><TableSchema><Field><Name>hostname</Name><Type>str</Type></Field>
    <Field><Name>query</Name><Type>hs</Type></Field>
<Field><Name>queryCode</Name><Type>u</Type></Field>
    <TableData><rec><DataField>Name1</DataField><DataField>Long
Query1</DataField><DataField>27654</DataField>
    <rec><DataField>Name2</DataField><DataField>Long
Query2</DataField><DataField>98456</DataField></TableData></Table>
    <end>\n
```

GETALL: This command returns all records from the table specified by id. A getall command uses the following format:

getall\n id\n

This command returns all records in the form:

```
(column_name1, column_name2,..., column_nameN)
(rec1_data1,rec1_data2,...,rec1_dataN)
    .
    .
    .
(recN_data1,recN_data2,...,recN_dataN)
```

It queries the database for 5000 records at a time and returns them. This will work for any size table.

Example getall\n registrydb\n

GETSQL: This command returns all records queried by the sql_statement. A getsql command has the following format:

getsql\n id\n sql_statement\n

Returns the result of sql_statement in the format:

```
(column_name1, column_name2,..., column_nameN)
(rec1_data1,rec1_data2,...,rec1_dataN)
    .
```

```
    .
    .
(recN_data1,recN_data2,...,recN_dataN)
```

Only use SELECT statements with this command.

Example getsql\n registrydb\n SELECT * FROM registrydb WHERE ukey>1000\n

GETXML: This command returns all the records from the table specified by ID in XML format. A getxml command uses the following format:

getxml\n id\n

Example getxml\n registrydb\n

GETXMLSQL: This command returns all records queried by sql_statement from the table specified by id in XML format. A getxmlsql command has the following format:

getxmlsql\n id\n sql_statement\n

It returns, as a result, the sql_statement in XML format.

Example getxmlsql\n registrydb\n SELECT * FROM registrydb WHERE ukey>1000\n

GETARFF: This command returns all records from the table specified by id in ARFF format. A getarff command has the following format:

getarff\n id\n

STATUS: This command shows info about the connection and database. It returns the version number, current database, and info about all connections. Status uses the following format:

status\n

HELP: This command lists all available commands, and returns a list of available commands. Help uses the following format:

help\n

QUIT: This command logs off the server Quit uses the following format:

quit\n

ADMINKILL: This command shuts down the server. Adminkill uses the following format:

adminkill\n

The ID is the name of the table to be used. All commands are in lower case. In the discussion above, "\n" means endline character, which the line to be read in. In order to insert "\", the escape character must be used (i.e., type "\\"). A column named key is not allowed by sql. A log file dware.log keeps track of errors A Sample Session appears below:
password ntsecurity
help
status
getall ntsecurity
quit Tag Rules: These tag rules are to be used with the insert command and the quickinsert command. A record is defined as a text string between <rec> . . . </rec>. Each item in the tag is tagged as follows: the tag name is the column name within the table it resides in. The table name is obtained from an api function. Also, each tag has a type associated with it, such as int, char25, etc. So an item in a record will look like: <compname s> . . . </compname>. The end tag only has the name of tag. In the above example, the tag means it goes into column "compname" and is of type "s" (e.g., a string of 25 characters).

The following tags are supported:
i=int unsigned
l=long unsigned
u=int unsigned (11 digits)
float=floating point number (20 digits)
vchar25, vchr25=variable length string max length 25
str=variable length string max length 40
s=variable length string max length 45
ls=variable length string max length 120
hs=variable length string max length 250
c=character
char25, chr25=string length 25
ti=time (hh:mm:ss)
t=time (hh:mm:ss)
d=date (yyyy-dd-mm)
model=a variable length string that can store up to 16 MB used for storing models Insert XML Tag Rules. These tag rules are to be used with the insertxml command. To use insert using the insertxml command, an XML Table object must be created. The table has two parts: Part 1 is the Table Schema which contains the column names and their associated type. Part 2 is the Table Data which contains the list of records to be inserted in the table. Each column of a particular record must be in the same order as the columns in the Table Schema. Table has the following format:

```
<Table>
    <TableSchema>
        <Field>
            <Name> user </Name>
            <Type> str </Type>
        </Field>
        <Field>
            <Name> program </Name>
            <Type> str </Type>
        </Field>
    </TableSchema>
    <TableData>
        <Rec>
            <DataField> gnikcah </DataField>
            <DataField> getadmin.exe </DataField>
        </Rec>
        <Rec>
            <DataField> foo </DataField>
            <DataField> foo.exe </DataField>
        </Rec>
    </TableData>
</Table>
```

The following column types are supported:
i=int unsigned
l=long unsigned
u=int unsigned (11 digits)
float=floating point number (20 digits)
vchar25, vchr25=variable length string max length 25
str=variable length string max length 40
s=variable length string max length 45
ls=variable length string max length 120
hs=variable length string max length 250
c=character
char25, chr25=string length 25
ti=time (hh:mm:ss)
t=time (hh:mm:ss)
d=date (yyyy-dd-mm)
model=a variable length string that can store up to 16 MB used for storing models IDS Data Formats: The IDS components exchange data (including sensor records and models) in XML-based formats. The XML format was chosen for the following reasons: (1) Metadata—XML provides a clean and straightforward way to mark up sections of data with useful metadata. e.g., 'normal'/'attack.' In addition, such information can be added at a later time to enable additional functionality, without breaking existing software that operate on the data (provided the software follows XML parsing requirements). (2) Linking—The linking capabilities of (or associated with) XML offer some capability, such as links among models and the data sets used to generate them. (3) Tools—Several XML parsing tools are available for free non-commercial use. There are bindings in C, Java, Tcl, and others. Generating XML fragments from the data should is straightforward, and requires little extra processing in addition to what is already needed for text encoding and transmission.

Sensor Data: The sensor data format is designed to facilitate data exchange in a system that contains a variety of Sensors, Detectors, Model Generators, a Data Warehouse, and other potential components. While sensors are the primary producers of sensor data, other components can not only read and analyze, but also annotate a piece of data after it's initially gathered.

From the intended use of the sensor data format, the following desirable properties were required: (1) Generality: sensors and the data they produce evolve with the systems that they monitor as well as with sensor techniques and analysis needs. Consequently, the format should have enough generality so that the system can accommodate these changes and remain useful. (2) Encoding useful information: Even though some components, particularly the Data Warehouse, may not understand the precise semantics of a piece of data, some useful operations need to be performed on it. In particular, Model Generators should be able to present to the Data Warehouse query criteria that include actual data attributes as well as meta data.

Format: This version of the format is mainly used to encode tabular data (i.e., list of records with a fixed schema) which is very common. It provides tags for three types of information about each table: the records, the table schema, and meta data for the table. In addition, it supports annotation at the record (i.e., row) level.

An example:

```
<SensorData>
    <Meta>
        <Source> fruit.cake.food.org </source>
```

```
        <SensorID> NT42 </SensorID>
        <SensorType> HOSTBASED_NT </SensorType>
        <Time> 11/22/2001, 12:25:40 GMT </Time>
    </Meta>
    <Table>
        <TableSchema>
            <Field>
            <Name> user </Name>
            <Type> string </Type>
            </Field>
            <Field>
            <Name> program </Name>
            <Type> string </Type>
            </Field>
        </TableSchema>
        <TableData>
            <Rec>
            <DataField name="user"> gnikcah </DataField>
            <DataField name="program"> getadmin.exe
            </DataField>
            <Annotation>
            an attack!
            </Annotation>
            </Rec>
        </TableData>
    </Table>
</SensorData>
```

The Formal DTD:

```
<!ELEMENT SensorData (Meta, Table)>
<!ELEMENT Meta (MetaVal)*>
<!ELEMENT MetaVal (#PCDATA)>
<!ATTLIST MetaVal
    name CDATA #REQUIRED>
<!ELEMENT Table (TableSchema, TableData)>
<!ELEMENT TableSchema (Field)+>
<!ELEMENT Field (Name, Type)>
<!ELEMENT Name (#PCDATA)>
<!ELEMENT Type (#PCDATA)>
<!ELEMENT TableData (Row)*>
<!ELEMENT Row (DataField+, Annotation?)>
<!ELEMENT DataField (#PCDATA)>
<!ATTLIST DataField
name CDATA #REQUIRED>
<!ELEMENT Annotation (#PCDATA)>
```

The format described above emphasizes (human) readability over space efficiency. It is contemplated abbreviations (e.g., "DataField"→"DF") may be introduced to save space as well as parsing time.

We claim:

1. A system for detecting intrusions in operations of a computer system comprising:
   (a) a plurality of sensors, each sensor configured to gather information regarding the operation of the computer system, to format the information in a data record, and to transmit the data record;
   (b) one or more databases configured to receive the data record from the sensor, to store the data record, and to store an intrusion detection model;
   (c) a detection model generator configured to request training data from a plurality of data records from the one or more databases, said training data comprising data collected from at least two sensors, to generate the intrusion detection model based on said training data from a plurality of data records, and to transmit the intrusion detection model to the one or more databases;
   (d) a detector configured to receive a data record from the sensor and to classify the data record in real-time as one of normal operation and an attack based on said intrusion detection model;
   (e) a data analysis engine including at least a specially-programmed microprocessor configured to request data records from the one or more databases and to perform a data processing function on the data records;
   (f) a detection model generator configured to update the intrusion detection model in real-time;
   (g) a detection model distributor configured to receive said intrusion detection model from the one or more databases and to transmit the detection model to at least one detector;
   (h) a forensics analysis engine configured to retrieve a set of historical data from the one or more databases and apply a detection algorithm to find anomalous activity in the data set; and
   (i) a visualization analysis engine configured to:
      display the selected data from the one or more databases in real-time;
      enable a system administrator to identify suspicious activity, not automatically identified by the intrusion detection model, as an attack in real-time; and
      update the intrusion detection model based on the suspicious activity identified by the system administrator.

2. The system according to claim 1, wherein the data record is modified prior to storage in the one or more databases.

3. The system according to claim 1, wherein the sensor is a network sensor.

4. The system according to claim 1, wherein the sensor is a host sensor.

5. The system according to claim 1, wherein the data record comprises information regarding a source of the information.

6. The system according to claim 1, wherein the detection model generator is configured to periodically generate an updated intrusion detection model.

7. The system according to claim 1, wherein the detection model is a probabilistic model.

8. The system according to claim 7, wherein the detection model generator is configured to generate a parameterization of the probabilistic model.

9. The system according to claim 8, wherein the detector is configured to compute a probability associated with the data record.

10. The system according to claim 1, wherein the detection model is a set of support vectors which correspond to a decision boundary in a feature space.

11. The system according to claim 10, wherein the detection model generator is configured to generate a set of support vectors.

12. The system according to claim 11, wherein the detector is configured to map a data record to the feature space and determine the location of the data record in the feature space with respect to the decision boundary.

13. The system according to claim 1, wherein the sensor is configured to format the information in the data record in one or more predetermined formats.

14. The system according to claim 1, wherein the data analysis engine is further configured to append label data to the data records in the one or more databases.

15. The system according to claim 1, wherein the data analysis engine is configured to extract a feature from a plurality data records.

16. The system according to claim 15, wherein the data analysis engine is configured to append the feature data to the data records.

17. A method for detecting intrusions in operations of a computer system comprising:

(a) gathering information regarding the operation of the computer system at a plurality of sensors and formatting the information from each sensor into a data record;
(b) transmitting the data record to one or more databases, and storing the data record in the one or more databases;
(c) generating an intrusion detection model comprising requesting training data from a plurality of data records from the one or more databases, said training data comprising data collected from at least two sensors, transmitting the intrusion detection model to the one or more databases, and storing the intrusion detection model at the one or more databases;
(d) classifying a data record as one of normal operation and an attack based on the intrusion detection model comprising receiving the data records from the sensor;
(e) requesting using at least a specially-programmed microprocessor a data record from the one or more databases and performing a data processing function on the data record;
(f) updating the intrusion detection model in real-time;
(g) transmitting the intrusion detection model from a detection model distributor to at least one detector;
(h) enabling a system administrator to identify suspicious activity, not automatically identified by the intrusion detection model, as an attack in real-time; and
(i) updating the intrusion detection model based on the suspicious activity identified by the system administrator.

18. The method according to claim 17, further comprising modifying the data record prior storing the data record in the one or more databases.

19. The method according to claim 17, wherein the gathering information regarding the operation of the computer system at a sensor comprises providing a network sensor.

20. The method according to claim 17, wherein the gathering information regarding the operation of the computer system at a sensor comprises providing a host sensor.

21. The method according to claim 17, wherein the gathering information regarding the operation of the computer system at a sensor comprises formatting the data record with information relating to a source of the information.

22. The method according to claim 17, further comprising periodically generating an updated the-intrusion detection model.

23. The method according to claim 17, wherein the generating an intrusion detection model comprises generating a probabilistic model.

24. The method according to claim 23, wherein the classifying a data record as one of normal operation and an attack comprises computing a probability associated with the data record.

25. The method according to claim 17, wherein the generating an intrusion detection model comprises generating a set of support vectors which correspond to a decision boundary in a feature space.

26. The method according to claim 25, wherein the classifying a data record as one of normal operation and an attack comprises mapping a data record to the feature space and determining the location of the data record with respect to the decision boundary.

27. The method according to claim 17, wherein the formatting the information into a data record comprises formatting the information into the data record in one or more predetermined formats.

28. The method according to claim 17, comprising appending a label to the data records in the one or more databases.

29. The method according to claim 17, wherein the requesting data from the one or more databases comprises extracting a feature from a plurality data records.

30. The method according to claim 29, further comprising generating feature data based on the feature and appending the feature data to the data records in the one or more databases.

* * * * *